US011766920B2

(12) United States Patent
Turudic

(10) Patent No.: US 11,766,920 B2
(45) Date of Patent: Sep. 26, 2023

(54) SELECTIVE EFFICIENCY TRACTION INVERTERS AND CHARGERS AS HEAT SOURCES FOR THERMAL CONDITIONING OF ELECTRIC VEHICLES

(71) Applicant: RANCHO DEL I.P., Sheridan, WY (US)

(72) Inventor: Andy Turudic, Hillsboro, OR (US)

( * ) Notice: Subject to any disclaimer, the term of this patent is extended or adjusted under 35 U.S.C. 154(b) by 0 days.

(21) Appl. No.: 17/978,762

(22) Filed: Nov. 1, 2022

(65) Prior Publication Data

US 2023/0249520 A1    Aug. 10, 2023

Related U.S. Application Data

(63) Continuation-in-part of application No. 17/857,895, filed on Jul. 5, 2022, which is a continuation of application No. 17/710,617, filed on Mar. 31, 2022, now Pat. No. 11,407,280.

(60) Provisional application No. 63/415,776, filed on Oct. 13, 2022, provisional application No. 63/308,911, filed on Feb. 10, 2022.

(51) Int. Cl.
*B60L 15/02* (2006.01)
*B60H 1/03* (2006.01)
*B60H 1/00* (2006.01)

(52) U.S. Cl.
CPC ......... *B60H 1/034* (2013.01); *B60H 1/00385* (2013.01); *B60L 15/02* (2013.01); *B60L 2240/525* (2013.01); *B60L 2240/529* (2013.01); *H02P 2201/09* (2013.01)

(58) Field of Classification Search
CPC ............... B60L 15/02; B60L 2240/525; B60L 2240/529; H02P 2201/09
See application file for complete search history.

(56) References Cited

U.S. PATENT DOCUMENTS

| | | |
|---|---|---|
| 5,058,391 A | 10/1991 | Periot |
| 5,291,960 A | 3/1994 | Brandenburg |
| 5,483,807 A | 1/1996 | Abersfelder |
| 5,537,956 A | 7/1996 | Rennfeld |
| 5,647,534 A | 7/1997 | Kelz |
| 6,124,644 A | 9/2000 | Olson |

(Continued)

OTHER PUBLICATIONS

Baba, H., Kawasaki, K.., and Kawachi, H., "Battery Heating System for Electric Vehicles," SAE Technical Paper 2015-01-0248, 2015, doi:10.4271/2015-01-0248.

*Primary Examiner* — Rina I Duda

(57) ABSTRACT

Selective efficiency multi-phase traction inverters and chargers as heat sources for thermal conditioning of electric vehicles is provided. The traction inverter comprises a plurality of phases, each of the plurality of phases having at least one semiconductor switching device, the at least one semiconductor switching device configured to switch between at least three differing states, for thermal management of the electric vehicle components and compartments. The traction inverter includes a controller coupled to the plurality of phases, to operate the plurality of phases in a first mode of the traction inverter to drive the electric motor as a traction motor. The controller operates the plurality of phases in a second mode of the traction inverter as a first type of converter. The controller to operate the plurality of phases in a third mode of the traction inverter as a second type of converter.

20 Claims, 16 Drawing Sheets

Three-Phase Two-Level Inverter Using IGBTs

(56) References Cited

U.S. PATENT DOCUMENTS

| | | | |
|---|---|---|---|
| 6,138,466 | A | 10/2000 | Lake |
| 6,186,254 | B1 | 2/2001 | Mufford |
| 6,213,233 | B1 | 4/2001 | Sonntag |
| 6,347,528 | B1 | 2/2002 | Iritani |
| 6,360,835 | B1 | 3/2002 | Skala |
| 6,394,207 | B1 | 5/2002 | Skala |
| 6,448,535 | B1 | 9/2002 | Ap |
| 6,464,027 | B1 | 10/2002 | Dage |
| 6,467,286 | B2 | 10/2002 | Hasebe |
| 6,569,550 | B2 | 5/2003 | Khelifa |
| 6,651,761 | B1 | 11/2003 | Hrovat |
| 6,708,513 | B2 | 3/2004 | Koehler |
| 6,743,539 | B2 | 6/2004 | Clingerman |
| 6,772,603 | B2 | 8/2004 | Hsu |
| 6,797,421 | B2 | 9/2004 | Assarabowski |
| 7,048,044 | B2 | 5/2006 | Ban |
| 7,150,159 | B1 | 12/2006 | Brummett |
| 7,191,858 | B2 | 3/2007 | Vanderwees |
| 7,259,469 | B2 | 8/2007 | Brummett |
| 7,382,102 | B2 * | 6/2008 | Ashtiani ........... H02M 7/53871 318/801 |
| 7,591,143 | B2 | 9/2009 | Zeigler |
| 7,591,303 | B2 | 9/2009 | Zeigler |
| 7,841,431 | B2 | 11/2010 | Zhou |
| 10,960,785 | B2 | 3/2021 | Villanueva |
| 2017/0047747 | A1 * | 2/2017 | Kufner ..................... H02J 7/34 |
| 2018/0205341 | A1 * | 7/2018 | Syed ....................... H02M 3/04 |

\* cited by examiner

Example of a 3 Phase Traction Motor Inverter

| Vector | S1 | S2 | S3 | S4 | S5 | S6 | VAB | VBC | VCA | Vector Mode |
|---|---|---|---|---|---|---|---|---|---|---|
| {000} | | | | | | | | | | Zero |
| {100} | ON | ON | OFF | ON | OFF | OFF | +VDC | 0 | -VDC | Active |
| {100} | ON | ON | ON | OFF | OFF | OFF | 0 | +VDC | -VDC | Active |
| {010} | OFF | ON | ON | OFF | OFF | ON | -VDC | +VDC | 0 | Active |
| {011} | OFF | OFF | ON | OFF | ON | ON | -VDC | 0 | +VDC | Active |
| {001} | OFF | OFF | OFF | ON | ON | ON | 0 | -VDC | +VDC | Active |
| {101} | ON | OFF | OFF | ON | ON | OFF | +VDC | -VDC | 0 | Active |
| {111} | | | | | | | | | | Zero |

FIG. 6

Rotation - Reversible
CWSE (clockwise rotation looking from shaft end):
Connect S1 to One Battery Terminal
Connect S2 to A1
1411 — Connect A2 to Other Battery Terminal
CCWSE (counterclockwise rotation looking from shaft end):
Connect S1 to One Battery Terminal
Connect S2 to A2
Connect A1 to Other Battery Terminal
FIG. 14B
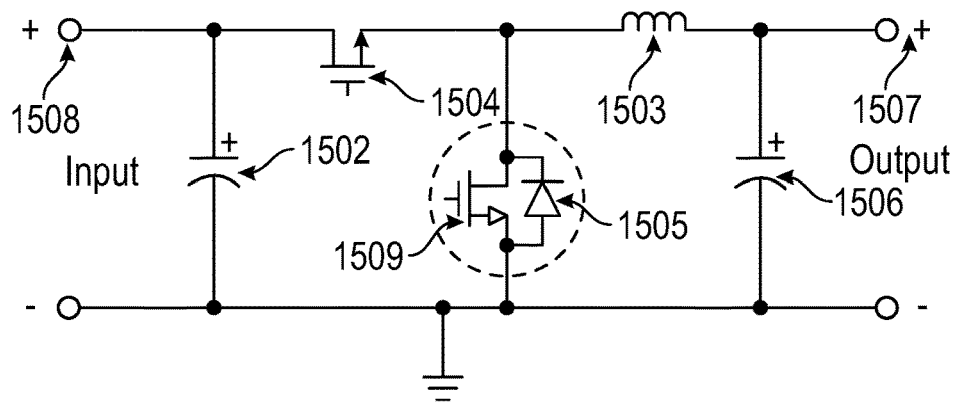
FIG. 15A
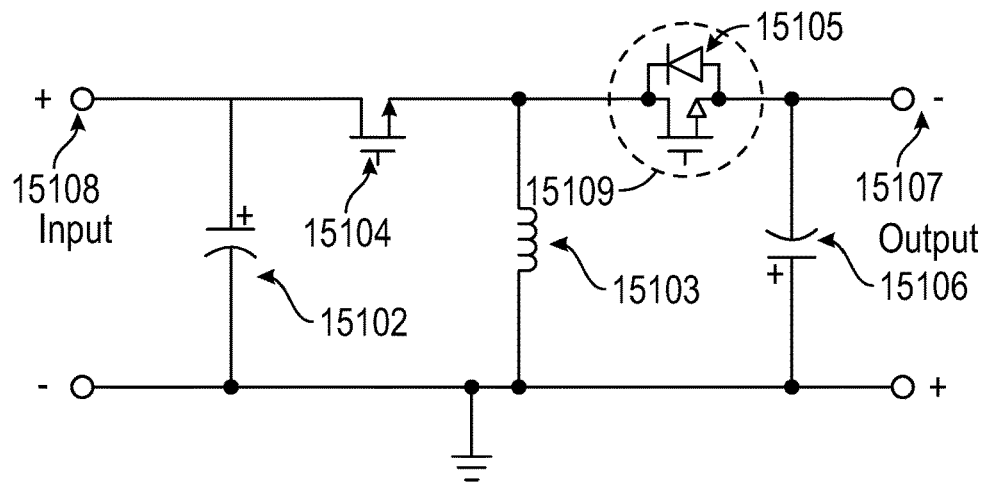
FIG. 15B

SELECTIVE EFFICIENCY TRACTION INVERTERS AND CHARGERS AS HEAT SOURCES FOR THERMAL CONDITIONING OF ELECTRIC VEHICLES

TECHNICAL FIELD

The technical field of the present disclosure relates generally to electrically propelled vehicles ("EV"), more specifically heating of electrically propelled vehicles, and operation of traction inverters and onboard chargers, and drivers for traction inverters and onboard chargers.

BACKGROUND

Electric vehicles have many variations of powertrains, which typically feature an energy storage system such as a battery or fuel cell, traction inverters or traction motor controllers, and electric motors, along with an onboard or offboard vehicle charging system. The various components of electric vehicles, their support equipment, and the passengers thereof, have various heating and cooling needs that are addressed with various technological solutions, some of which are reviewed herein. There is an ongoing need for improvements in electric vehicle technology and reduction in cost of electric vehicles. It is in this context that present embodiments arise.

SUMMARY

Various embodiments of an electric vehicle heating system, traction inverters, onboard chargers, driver circuits, and method of operation are described herein. Embodiments make use of a novel intermediate state, between fully-turned-off and fully-turned-on, for operating a switching device to intentionally produce high levels of Joule heating in order to eliminate costly resistive heating components.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 5C and 5D-1-5D-3 depict added circuitry and connections in a further example three-phase traction inverter, as a further modification of the three-phase traction inverter of FIGS. 5A and 5B and further embodiment.

FIG. 6 illustrates a Table having space vector modulation strengths in accordance with some embodiments.

FIGS. 14A-1 and 14A-2 depicts an electric motor and diode bridge, as used with or in an embodiment.

FIG. 14B depicts a connection chart that can be used in an embodiment.

FIGS. 15A and 15B depicts a further buck converter and buck-boost converter, the functionality of which is achieved in an embodiment of a traction inverter.

DETAILED DESCRIPTION

Figure 1:
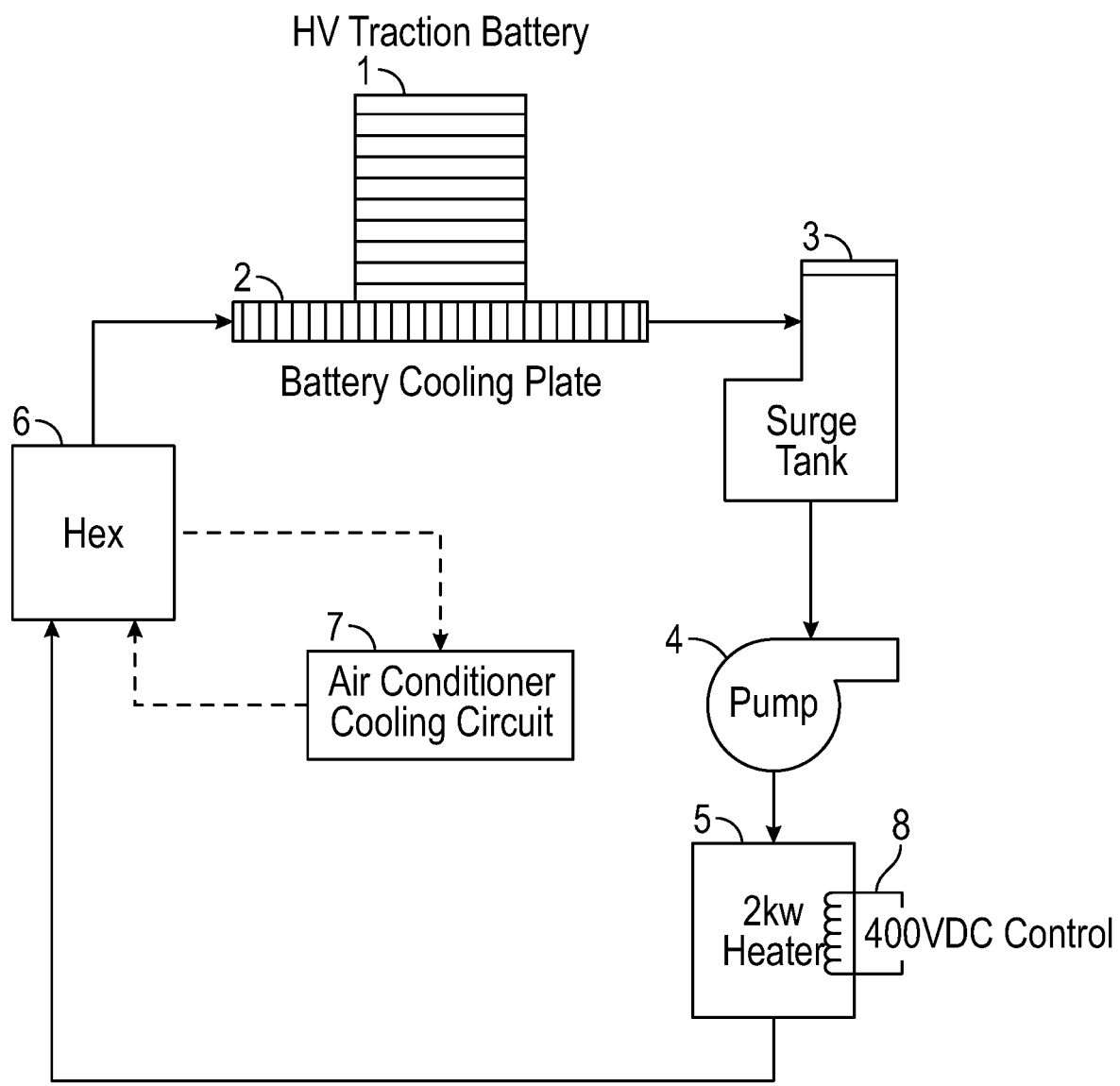
FIG. 1 depicts a hybrid/electric vehicle battery cooling system.

Described herein, in various embodiments, is a heating system for electric vehicles, which can be implemented as an ultra-low cost energy storage system preheater and/or heater and/or occupant heater. The embodiments create a novel electric vehicle traction inverter design that adds a third mode/state of operation to high power output stage switching devices. Present state of the art has two fundamental states for output stage switching of switching devices in high efficiency traction inverters, irrespective of the number of levels of voltage output produced by the inverter architecture—a high conductivity, low resistance, lowest power dissipation, fully-on switching state; and a zero conductivity, infinite resistance, zero power dissipation fully-off switching state. The present embodiments introduce a third switching state for a switching device, produced by a driver circuit that controls the switching device—a high power dissipation, semi-off, partially conductive, intermediate state (i.e., a state between fully-on state and fully-off state) which is selectively enabled in place of the zero power dissipation fully-off state, enabling switching device(s) to be used as a useful, controllable, heat energy source for such purposes that include vehicle cabin heating and energy storage system heating/preconditioning to replace or augment resistive heating devices and maximize overall vehicle efficiency by avoiding the dumping of heat from the traction inverter, or vehicle charger, overboard into the atmosphere and by eliminating the need to use, or reducing the amount of, power to utilize a heat pump device to move the heat from the traction inverter, or vehicle charger, to another location. This semi-off, intermediate state operates in one embodiment as MOSFET(s) gate(s) driven slightly above threshold voltage, a typically uncharacterized power device operating region, creating a partially conductive channel that restricts, but has non-zero, current flow with high voltage applied across drain and source of the MOSFET, producing controllable, and high levels, of Joule heating that heats a coolant intended to transfer heat away from the MOSFET. It should be appreciated that heat can also be moved using conduction or convection instead of by fluids or phase change cooling/heating in some embodiments.

The present embodiments eliminate costly dedicated resistor-based heating components, as found in electric vehicles for example, that are used as heat sources for thermal conditioning of vehicle components that include such components as traction energy storage systems, and as sources of heat energy for heating spaces and compartments, such as the vehicle cabin. While high power electronics are meticulously designed for maximum efficiency, and heat energy losses are considered detrimental, the present embodiment intentionally and selectively operates such devices in such modes so as to act as electrical resistors or current limiters/"throttles" to intentionally dissipate high levels of power in the switching device in order to provide a source of high thermal power that is then transported to heat exchangers by such means as conduction, convection, or by a liquid, phase change, or gas (including air) coolant to the device or environment in which the temperature is to be raised. Such high current devices associated with an electric vehicle include switching devices (e.g., semiconductor-based switches) that control traction motors, that perform DC-DC conversion, that perform AC to DC charging, and that drive high powered motors that include such devices as power steering pumps and air conditioning compressors and pumps. Such devices may be located on or in the vehicle or may be associated with an electric vehicle from time to time such as a vehicle charging station. As such, the sources of heat are not by necessity centralized and can produce heat for isolated coolant regimes, and may be transferred by such means as heat exchangers, or thermal media transfer, from one regime to another, as is currently practiced in the art for electric vehicle thermal conditioning. One aspect of the embodiment is that it allows continuous control of the amount of heat that is produced in one embodiment, whereas another method turns a high loss mode of operation on and off. It should be appreciated that these mechanisms facilitate control of the temperature of the system in which the devices are thermally incorporated and provide a mechanism to exploit, minimize, and eliminate, waste heat that would otherwise be dumped overboard into the environment due to excessive power level generation for a vehicle subsystem. The heat from the devices can be moved from the lossy switching device source by means of conduction, as would be exemplified by generating power in an air conditioning heat pump or compressor motor's semiconductor drivers in operation for transporting heat from one location to another, or drying air or defrosting a windshield, for example, by fluid (gas or liquid) transport, or by phase change or other suitable heat transfer/transport mechanisms. While high power devices, in the kilowatts regime of power control are identified, nothing prevents scavenging of heat from lower power switching devices operating in an embodiment that uses the third switching state, as well by such things as a heat pump or heat pipe, aggregating sources of heat. In one embodiment, the power devices are MOSFETS, which are typically run in a low resistance mode (high gate voltage, low ($R_{ds}$)—drain to source resistance, fully-on state) to produce minimal waste heat and in a very high resistance mode (low or even negative gate voltage, below threshold voltage, high drain to source resistance, fully-off state). Such power switching devices are herein run in the "triode" or linear resistor region, or with a low gate voltage and high drain to source voltage in the saturation region as partially conductive current limiters by pinching off part of the conduction channel to produce an effective current throttle in their conduction channels between the device source and drain terminals, creating a temperature rise because of the $I^2R$, or $V*I$, power losses to deliberately produce Joule heating, which is a product of the square of the current through the power device and the resistance of the aforementioned conduction channel or simply the power dissipated by limiting its current as a product of the applied voltage to it, $V*I$. Such modes of operation of a switching device in an intermediate state between fully-off and fully-on are novel in a traction inverter, and have been completely oblivious to designers that strive for maximum system efficiency through use of switching devices only in the fully-on and fully-off states as operation in this third regime would be deemed inefficient. Datasheets from manufacturers of the high-power switching devices do not characterize or specify this near-threshold-voltage region of device operation because it is simply not used by anyone practiced in the art. Generally, this paradigm of striving for efficiency in a traction inverter is viewed from within the designer's "siloed" system design, which focuses only on the traction inverter itself. When the overall vehicle is considered, however, heat in the embodiments discussed herein is reused for productive purposes like heating the passenger cabin or in heating the energy storage system for more efficient or higher energy delivery or acceptance. In that case, the heat intentionally generated by the instant embodiment is applied to productive means, making the "wall plug efficiency" of the mobility solution more efficient by utilizing the heat that would have been dumped out of a radiator as a waste product of the switching process by practitioners of the art taking pride in achieving "97% efficiency", for example, for their traction inverter subsystem which has its own dedicated cooling loop that dumps that 3% energy loss as heat overboard into the environment. These high power switching devices are generally liquid cooled to achieve million hour lifetimes, despite "the doors falling off the vehicle" after about 10,000 hours, i.e., projected life span of the power devices in an inverter is excessively longer than projected life span of many critical vehicle components and can be operated at elevated temperatures without harming vehicle lifetime, particularly in one of the embodiments as a Silicon Carbide switching device. As such, operating the switching devices at elevated temperatures in a third heating mode of switching does not affect overall vehicle life or reliability as long as temperature limitations are not exceeded.

Electric vehicles are used as a target application of one embodiment, though various embodiments could be used for other systems such as chemical processing plants, solar power systems, etc., varying somewhat in their schemes to thermally manage heat in the vehicle or other system. Some electric vehicles, for example the Chevrolet Bolt EV, partition their implementation into "islands" where each system is independent of the other, while the most recent incarnations of the Tesla Model 3/Y and Model S Plaid intermix everything and move the heat away from where it is undesirable to places is it needed though the use of a heat pump. The latter has proven itself not to be without flaws, with significant numbers of complaints from customers regarding an inability to heat the occupant cabin in extremely cold winter conditions, a well known limitation of heat pump systems where in household applications, electric heating strips are provided as backup heat sources in rooms. While heat pumps can improve vehicle efficacy through scavenging, to accommodate heating in winter conditions, the vehicle still requires a substantially sized supplemental heat source.

A review of the Chevrolet Bolt EV is presented first, then the present review progresses to the classical Tesla Model S cabin and battery heating system, to show representative implementations by practitioners of the art. Since the present embodiment concerns itself with heating, focus of these reviews will be on heating and not on cooling of the vehicle systems or using heat pumps to move heat from one environment or component/system to another. Again, these sources and scavenging methods are not exclusive to electric mobility devices.

Figure 2:
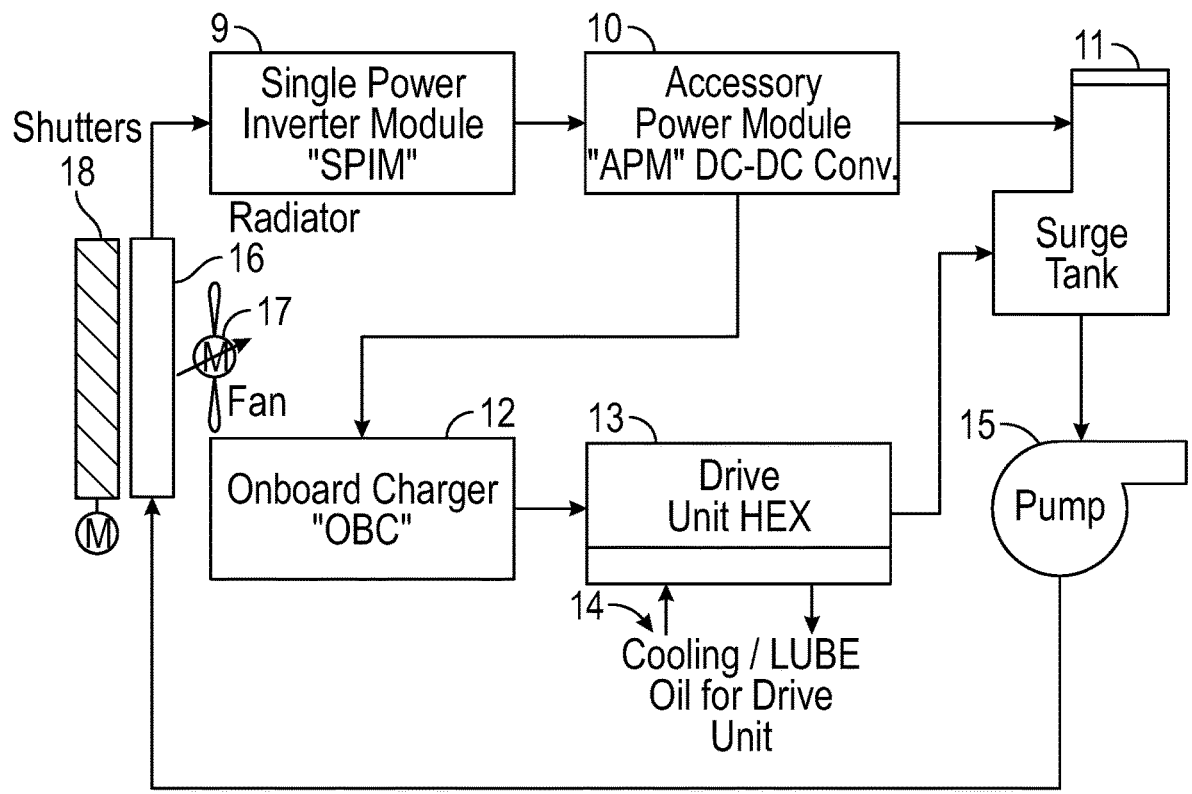
FIG. 2 depicts a hybrid/electric electronics system.
Figure 3:
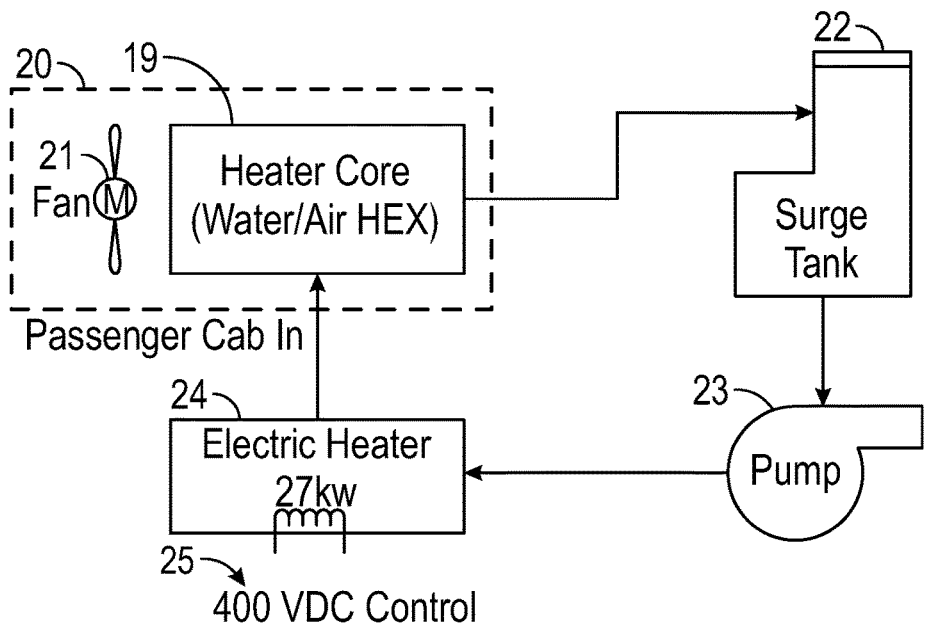
FIG. 3 depicts a hybrid/electric vehicle heater-coolant heater.

The Bolt EV has three independent thermal conditioning loops, somewhat misleadingly called "cooling" by Chevrolet when they are in fact, "thermal management." They are: 1) Hybrid/Electric Vehicle Battery 'Cooling' System (FIG. 1); 2) Hybrid/Electric Electronics 'Cooling' System (FIG. 2); and 3) Hybrid/Electric Vehicle Heater-coolant Heater (FIG. 3).

The Bolt EV heating/cooling loop, "Hybrid/Electric Vehicle Battery 'Cooling' System", shown in FIG. 1 is used to heat or cool the High Voltage Traction Battery 1. Thermal energy is transferred to or from the battery by means of a cooling plate 2. A coolant, typically ethylene glycol or propylene glycol, is used to move thermal energy in a loop, in this case the thermal energy from the battery cooling plate 2 to a reservoir, or "surge tank" 3. The surge tank then gravity feeds a variable speed pump 4 that pumps coolant in a steady flow around the loop at varying flow rates depending on the amount of energy to be moved. A general rule for lithium-based EV batteries is that they are preferentially kept at "comfortable human" temperatures, in the case of the Bolt EV, above 65 degrees Fahrenheit. If the battery temperature drops below this threshold, it becomes less efficient at delivering stored energy, and can be damaged if charged in excessively cold temperatures, so it needs to be heated in cold weather. The pump 4 circulates coolant through an electric heater 5, in the Bolt EV being powered from the ~400 VDC battery by a control circuit, and providing approximately 2 kW of thermal power to heat the coolant if the battery temperature is below its threshold of operation. As an aside, in some vehicles, not the Bolt EV, the battery is heated to higher temperatures prior to charging, on the order of 130° F.-140° F., to reduce the internal resistance of the battery to enable high "fast charging" rates—this process of preheating the battery before charging is called "preconditioning" in those vehicles. The heated or non-heated coolant then is routed to a heat exchanger ("HEX") 6 where the coolant can have its heat exchanged with the air conditioning refrigerant loop 7—in the Bolt EV this HEX is used for cooling the non-heated coolant only. From the HEX 6, the coolant is routed to the cooling plate 2 which transfers heat to/from the coolant, from/to the HV traction battery, by means of thermal conduction.

The Bolt EV cooling loop, "Hybrid/Electric Electronics 'Cooling' System", shown in FIG. 2, is used to cool the vehicle's high power electronics. The "single power inverter module", or SPIM 9, contains the high power drive electronics used to convert the ~400 VDC high voltage traction battery into a three phase alternating current of varying frequency, voltage, and current by methods known to those practiced in the art. The SPIM is designed to be maximally efficient, with much design effort to reduce the amount of waste heat produced in the process of "inverting" DC to AC for the traction motor. This loop only has provisions for cooling its components to ambient temperature via radiator 16. In the Bolt EV, the traction motor is on the order of 150 kW in power, and one can assume that the inverter normally operates with efficiency greater than 95%. At maximum power output, this means the inverter must dissipate up to 7.5 kW of heat, the equivalent of about a half dozen home space heaters. Fortunately, normal operation of the vehicle does not occur at maximum power levels for extended periods and actual "normal" driving uses about 18 kW to 30 kW of traction power from the motor, meaning about 900 W to 1.5 kW is to be dissipated as heat by the SPIM. The liquid coolant is then routed from the SPIM 9, to the "Accessory Power Module" 10, or APM, which DC-DC converts the ~400 VDC HV traction battery voltage to ~12 VDC to be used by 12V vehicle accessories and electronics and is used to charge an onboard 12V battery to provide power to the vehicle electronics and accessories while the HV battery is either disconnected or not in use. The APM replaces the alternator as found in an internal combustion vehicle, and delivers on the order of 100 Amps of current at a nominal 12V or about 1200 W. Assuming 90% efficiency, this means at maximum power delivery, the APM will need to dissipate approximately 120 W of power into the coolant. The higher power SPIM 9, precedes the APM 10. The coolant then splits to two paths with a simply Y-connected pair of hoses, with one path being a return to the top of the reservoir, or "Surge Tank" 11. The other half of the coolant flow split goes to the onboard charger, OBC 12, which only operates when the vehicle is charging. The Bolt EV is capable of charging at 12 amps at 240 VAC, which is about 3 kW. Assuming 90% efficiency, this means about 300 W of power needs to be dissipated into the coolant. The coolant then routes to a heat exchanger on the drive unit, HEX 13 to indirectly cool the oil used in the drive unit to lubricate moving parts and to extract heat from the motor components 14. The coolant then returns to the surge tank 11. From the surge tank, the coolant is gravity fed to a variable speed motorized pump which imparts flow to the coolant to push it to the radiator 16, which is a liquid to air heat exchanger. The radiator's cooling efficacy is assisted by the vehicle airstream when motorized shutters are opened, as well as a variable speed fan 17. The cooled coolant then is routed to the SPIM 11 to complete the loop.

The Bolt EV heating loop, "Hybrid/Electric Vehicle Heater-coolant Heater", shown in FIG. 3 is used to heat the passenger cabin by heating coolant, then using a heater core to exchange that coolant heat with the cabin air. The coolant reservoir, or "Surge Tank" 22, is used to hold a reserve of coolant. From the reservoir, coolant is gravity fed to a variable speed motorized pump 23, which then causes coolant to flow to an electric heater 24. This electric immersion heater 24 heats a resistive material using the HV traction battery's 400 VDC power, with on the order of a maximum of 7 kW of power, as delivered by the power and control circuits 25. Nominally, this heater has been observed to use approximately 2 kW to 3 kW in normal operation and the objective of the heater is to heat the coolant to a minimum of 130 degrees Fahrenheit. The heated coolant is then routed from the electric coolant heater 24 to a water to air heat exchanger 19, also known in the industry as a "heater core", housed in the passenger cabin 20. The heat transfer to the cabin air is maximized as needed by a variable speed motorized fan 21.

Figure 4:
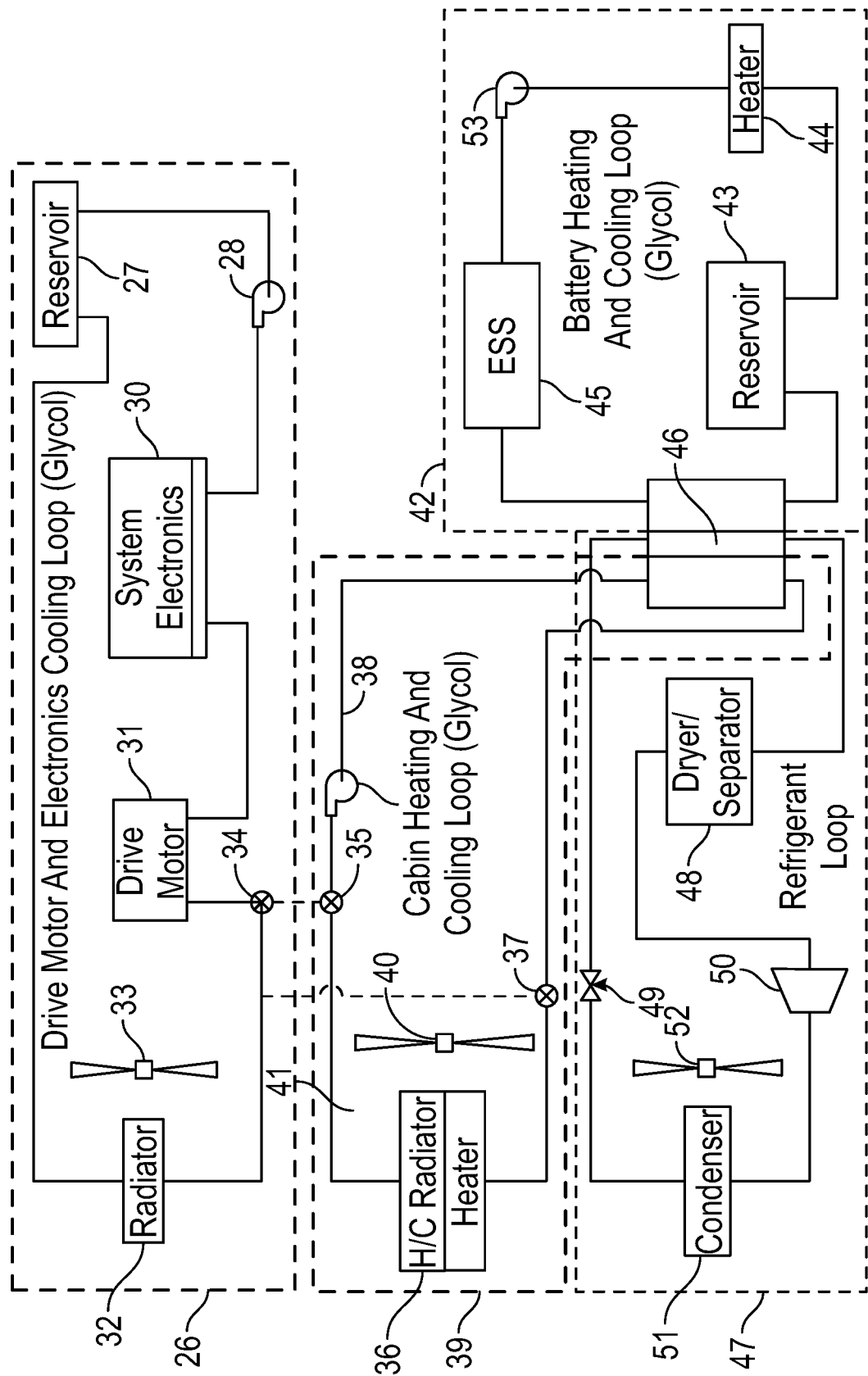
FIG. 4 depicts heating loops in an electric vehicle.

The Tesla Model S bears similarities to Bolt EV's loops. The Tesla's heating loops are shown in FIG. 4. As in the Bolt EV FIGS. 1, 2 and 3, respectively, the Tesla divides cooling loops into three similar domains, each with a dedicated coolant pump, with similar affected components, namely battery heating/cooling 42, vehicle electronics cooling 26, and cabin heating and cooling 39. The Tesla, however, enables crossing over between coolant domains, where heated coolant from the vehicle electronics can be used to heat the cabin, facilitated by valves 34, 35, 37 and can even use that heat to warm the battery via the heat exchanger HEX 46. An air conditioning system can be used to cool the battery via HEX 46. Notably an electric immersion heater 44 is used to warm coolant to heat the battery 45 and another electric heater 41 is used to warm the cabin air. In normal driving conditions, there simply is not enough heat generated in the inverter 30 or the drive motor 31 to heat the cabin or to preheat a stationary car's battery in preparation for charging. Newer generation Tesla vehicles use a heat pump to scavenge heat where possible, but in extremely cold weather, there isn't enough heat being generated in the vehicle, or is present in cold ambient air, to scavenge. The components in the vehicle were designed to minimize heat lost in their operation, which necessitates the inclusion of expensive heating element-equipped components in electric vehicles, as can be seen in FIG. 4 for cabin heating with significant additional cost for battery heating modules and controllers. These electric heaters are also generally necessitated in heat pump equipped vehicles operating in extremely cold weather conditions.

The embodiments described herein provide for a mechanism to reduce cost and complexity of the overall system and recognize that electrically produced heat is drawn from the energy storage system (in an EV, an HV (high voltage) battery, for example) irrespective of the element that generates that heat. Any "non-useful" heat dumped overboard via the radiator to the atmosphere is energy lost from the energy storage system that did not perform useful work or warming. Practitioners in the art are conditioned to maximize efficiency and reduce the heat produced by functional elements such as motor drive inverters and vehicle chargers, for example, and to throw that "minimized" heat away. To create the heat needed by vehicle cabin occupants in cold weather, to heat the energy storage system to operate at its maximum efficacy in cold weather, and to enable the energy storage system to be replenished or depleted at very high rates of charge or discharge, vehicle designers and architects add resistor-based electric heating devices in coolant loops associated with vehicle cabins and energy storage systems. The embodiments described herein dispose of these expensive resistor-based heating devices completely as needless devices, and intentionally repurpose and reuse existing components in the traction inverter described herein to deliberately generate Joule heating, in one traction inverter embodiment discussed here, in the vehicle charger in another embodiment, and in other embodiments can be applied to moderate to high power electronics driving such high loads of power steering, and air conditioning, pumps where heat is being scavenged by the likes of a heat pump or heat pipe.

Figure 5A:
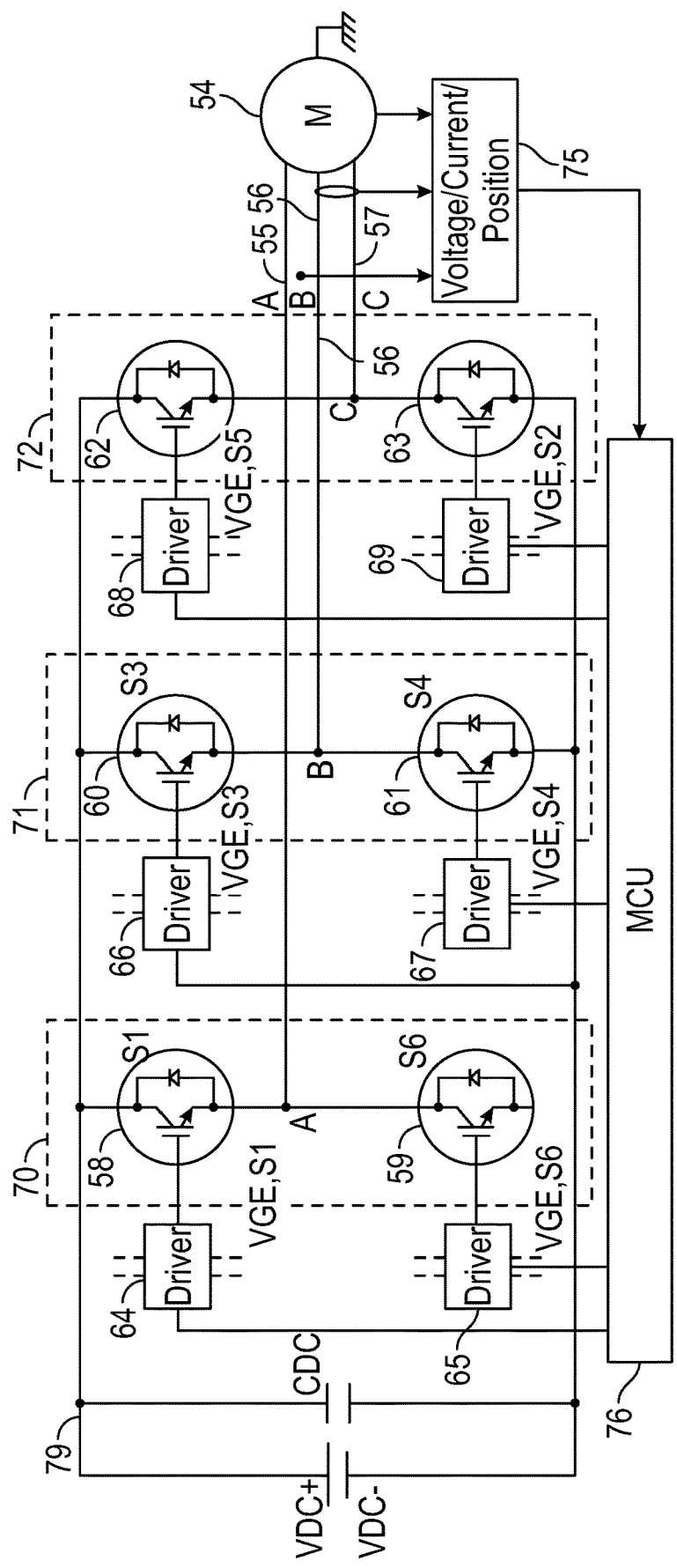
FIG. 5A depicts an example three-phase traction inverter for an electric motor of an electric vehicle in accordance with some embodiments.

FIG. 5A depicts an example three-phase traction inverter for an electric motor of an electric vehicle in accordance with some embodiments. Further embodiments, depicted in FIGS. 5B, 5C, and 5D1-5D3 have related functionality and operation in some versions to the embodiment in FIG. 5A, and are described with reference to FIGS. 12 and 13 below, having further features, operation and functionality.

In one embodiment MOSFET devices drive high power traction motor loads, such as is found in vehicle traction inverters. Other types of switching devices, including BJT (bipolar junction transistor), Insulated Gate Bipolar Transistors ("IGBT"), cascode amplifier and stacked transistor high voltage topologies, other types of FET, fluidic switching devices, MEMS devices, etc. are applicable to further embodiments. One attribute of a MOSFET is its ability to very quickly create a low resistance ($R_{ds}$) conductive channel between its source and drain terminals, or to very quickly "pinch off" that conductive channel completely to create an open circuit (ignoring tiny amounts of current leakage) allowing the device to act as a low loss switch. The switching on and off of very high currents on very high voltage power supplies by MOSFETs 58-63 (see FIG. 5A, depicting IGBTs, which are readily replaced by MOSFETs) is controlled by a "gate driver" 64-69 which controls a "gate" electrode by having a positive voltage applied to the gate electrode, $V_{gs}$, close in magnitude to its maximum allowable voltage to switch it on, or having the gate electrode at approximately the same potential, with respect to the source electrode to turn it off, respectively in the case of an N-channel device in one embodiment. For an inverter, turning the device on "hard", with a control, e.g., voltage gate to source of around 15-20V in one embodiment, results in creating a minimal $R_{ds}$ conductive channel, which means the square of current through the device multiplied by that $R_{ds}$ results in minimized power loss and device heating. Switching the device very quickly minimizes the time the devices spend in transition between full on and fully off states, reducing power dissipation and device heating while in the transition region of operation. For a typical Silicon Carbide MOSFET, a 400 amp device will have an $R_{ds}$ of around 6 milliohms when the MOSFET is fully-on, resulting in a power dissipation of around 960 W. 400 amps at a HV battery voltage of 400 VDC translates to the ability to drive a motor with 160 kW of power while losing only 960 W when the switching device is turned fully-on, resulting in a switching efficiency of 99.4% for the SiC MOSFET. An EV, though, only uses about 20 kW-60 kW in normal driving, so the thermal losses are on the order of only 15 W-135 W in the switching device discussed in the example embodiment because losses are related to the square of current.

To drive a brushless motor 54, in FIG. 5A, whether permanent magnet or induction, a varying electric field needs to be created in three phases, typically, though other embodiments may have more or fewer phases. This magnetic field in the motor is created by varying the current in the three windings 55, 56, 57 of the motor 54, as three distinct current waveforms that vary with time, ideally as sinusoids, and with a frequency more or less proportional to the motor rotational speed. The arrangement of switching devices, MOSFETS in the embodiment, is presented in FIG. 5A, MOSFETs 58-63. Though the states of the switching devices for a 2-level inverter are presented as vectors in the table 73 of FIG. 6, it is notable that there are only 6 active states per cycle 74, where each of the switching transistors is fully on or fully off for a total of half the cycle. Fully on, by methods used by those practicing the art, means minimal heat loss, maximum conduction, low $R_{ds}$ by means of fully driving the MOSFET gate with, typically, 15V to 20V. Fully off, again means zero current, which means 0V on the gate, but because of device characteristics and leakage, SiC MOSFETS', as in one embodiment, gate voltages are generally driven below the potential of the MOSFET source terminal to negative voltages, such as −5V to fully turn the device off.

In the currently discussed embodiment of FIG. 5A, each of the MOSFETs 58-63 has a driver circuit 64-69, associated with its gate electrode. Upon receiving a high or low signal from a control circuit, such as an MCU (microcontroller unit) 76, the driver circuit is designed to isolate the MCU's 3-5V signal from the high voltages (close to the HV battery voltage, e.g., on node 79 VDC+, such as 400 VDC) at which the "high side" MOSFETS 58, 60, 62 operate on their gate (despite −5V<$V_{gs}$<20V with respect to the MOSFET source terminal), and drive the high capacitance gate with sufficient strength to quickly switch the MOSFET fully on or fully off. Switching as quickly as possible is practiced by those versed in the art to minimize the power dissipated in the region between a fully on and fully off operational state.

MCU 76, or more generally a controller, is programmed to operate various switches in various modes in various embodiments, to arrange and rearrange various connections among components through the switches and switch states as controlled by the controller. MCU 76 can be embodied as one or more processors, distributed processing, multi-threaded processing, etc.

Figure 8:
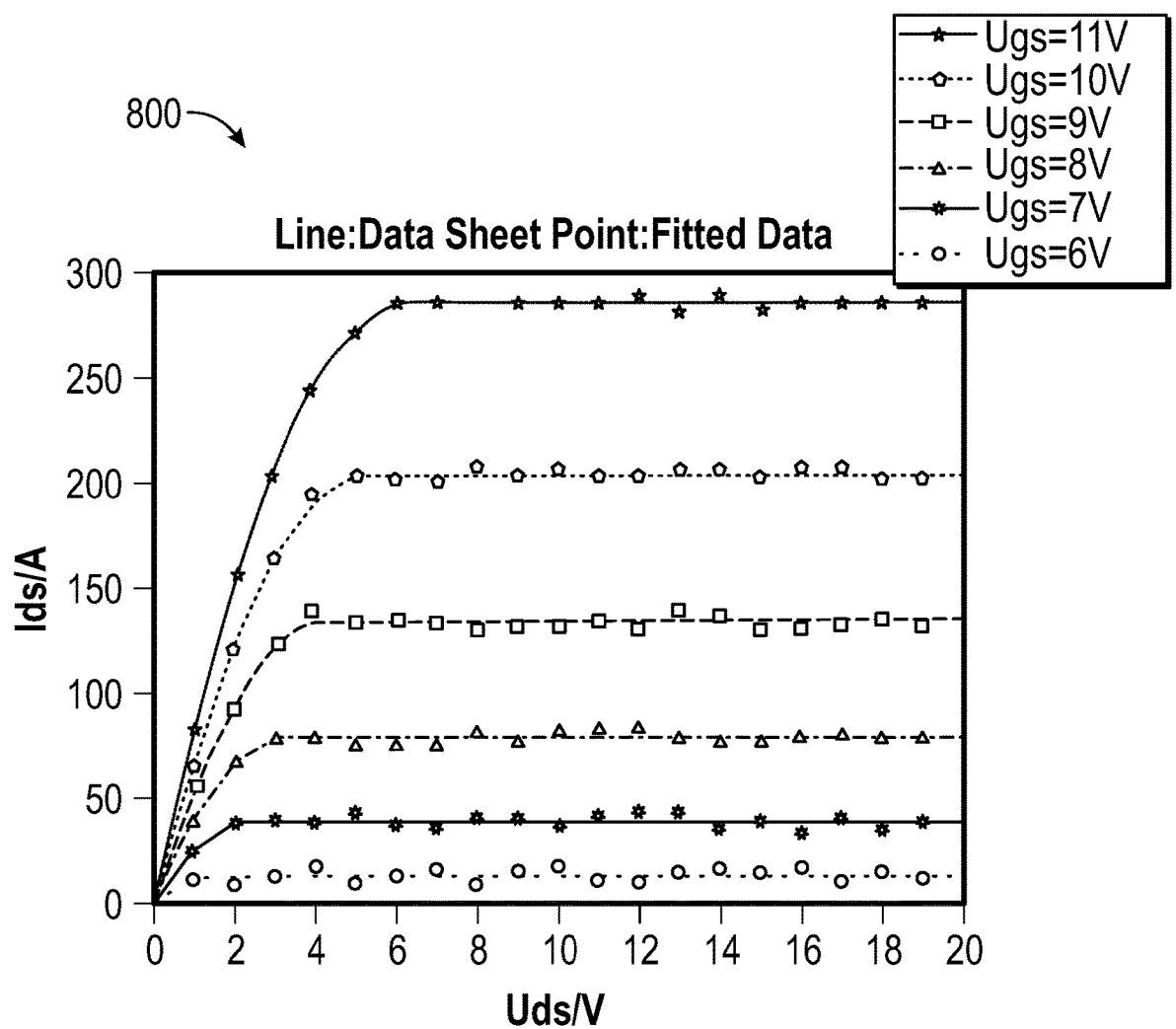
FIG. 8 depicts example MOSFET characteristic curves in accordance with some embodiments.

The embodiments add a novel element to a driver circuit by adding a third state of drive and operation to the MOSFET gate(s), which is according to a HEAT− signal in one embodiment. In one embodiment, the presence of an active low HEAT− signal, devices designated as OFF in table 73, are, instead, partly turned on to where they conduct a few amps of current. This is because the MOSFET channel is partially pinched off by low $V_{gs}$ voltages of a few volts, just slightly above the threshold turn-on voltage, "$V_{th}$"; in one embodiment +5V is used as an example, where $V_{th}$ is assumed to be around 2.5V typically. This voltage will vary by device type, from device to device and even among devices from within the same manufacturing lot, and could be temperature compensated in one embodiment or self-characterized in another embodiment to adjust for such device variations. In one embodiment, the operating mode of the switch device operates in a regime outside that encountered in normal power MOSFET operational ranges for switching applications and it may be difficult to find characteristic device curves from device manufacturers, such as $I_{ds}$ vs. $V_{ds}$ for $V_{gs}$ less than 10V—it's preposterous to intentionally burn power according to the thinking of many practicing the art of designing circuits utilizing switching devices and for the switching device product definers and applications engineers to contemplate such regions of intentional operation would reveal incompetence. FIG. 8 illustrates example modelling of power devices though they are not characterizations from manufacturers and merely were rigorous validations of models against real semiconductor operation by the modelers.

In the embodiment where MOSFET characteristic curves 800 of FIG. 8 provide a verification of the model against real device behavior, one thing that seems fairly consistent is that power dissipation is readily modulated over at least a 30:1 range using $V_{gs}$ in the 6V to 11V area for one example MOSFET, and related control voltages and power dissipation are readily understood for further MOSFETs and further types of switching devices. In one embodiment, a sense resistor or current transducer may be used between the source of the MOSFET and its lower connection (such as HV Battery negative for low side devices, or motor phase winding for high side devices) to provide feedback to finely control the amount of current flowing in the partially off MOSFET. In another embodiment, the MOSFET is in a current mirror with a smaller device made in the same process. Further types of current sensors, such as Hall Effect, induction, voltage measurement across parasitic resistance, sensing coils, etc., are readily applied to further embodiments. In an alternate embodiment, the objective is recognized to not be a current level, but heating coolant to an objective temperature without exceeding maximum switching device temperature ratings, so a temperature sensor in one embodiment, and a plurality of temperature sensors in another embodiment, are used to raise or lower the power dissipated in the switching device while in its third state of operation. In a further embodiment, a maximum temperature setpoint is sensed resulting in switching the device from its partially on state to its fully off state, despite a command to enter the heating mode, until a lower, hysteresis temperature is obtained in order to protect the switching device.

In one embodiment, a theoretical SiC MOSFET device has a saturated Ids drain current of 4 amps at a $V_{gs}$ of +5V. This means, when the mate device in its phase leg, i.e., one of phase legs 70, 71, or 72 of FIG. 5A, is fully on, the HV battery's, 75, voltage (in one embodiment, 400 VDC) is applied to the device, resulting in a power dissipation of 400*4=1.6 kW. This power is dissipated into the MOSFET's cooling system which heats a coolant in a loop. That coolant then transports the heat to where it will be useful, such as heating an occupant cabin, warming an energy storage device, which includes storing the heat energy itself, heating seats, or acting as a source of energy for some thermal device.

If the motor, 54 is not running, fully turning on the high side MOSFETS 58, 60, 62 (e.g., in the driver in FIG. 5A modified to use MOSFETs 58, 59, 60, 61, 62, 63 in place of IGBTs 58, 59, 60, 61, 62, 63) means no potential difference (voltage) is present across the motor windings 55, 56, 57, and therefore no current flows in the motor. However, if the HEAT− signal is applied, the low side MOSFETs 59, 61, 63 partially turn on, each dissipates 1.6 kW of heat, resulting in 4.8 kW of heat for the occupant cabin, for example. The third state facilitates heating to occur in the switching device despite the switched load having no current flowing in it, i.e., the load is "off". These low side devices can be modulated by PWM one embodiment, providing a full range of thermal power from almost zero to 4.8 kW, or can simply be turned on and off using "bang bang" control methods in another embodiment. In one embodiment, the vehicle is coasting or stopped, using its inertia to keep moving or remain motionless, while the motor has no current (the motor is not producing torque) flowing in it while the low side devices are producing heat from the energy storage device.

The MOSFETS can also alternate their motor off duties to generate intentional heat by partially turning on both the high side and low side MOSFETS to split the power dissipation between both devices, halving it in one embodiment, or in another embodiment by fully turning on the low side MOSFETS 59, 61, 63 and partly turning on the high side MOSFETs 58, 60, 62 (i.e., in the intermediate state), or in an alternate embodiment, PWM modulating those high side MOSFETs 58, 60, 62 with the low side turned on. With the motor running, not fully turning OFF the devices when the HEAT− signal is active, causes them to act as Joule heating sources while the motor current is largely unaffected. In this manner, various embodiments for an electric vehicle heating system can produce combined heating, through operation of one or more of the switching devices in the intermediate state, and main function operation of a traction inverter, through operation of switching devices in the fully-on and fully-off state, cycling the heating mode and a main function mode through each of various driver circuits. For example, an embodiment could modify Table 1 of FIG. 6, keeping the "ON" (i.e., fully-on) states, replacing one or more of the "OFF" (i.e., fully-off) states with the intermediate state described herein, for the heating mode of operation of the respective switching device while the inverter is operated in a main function mode to drive an electric motor. In another embodiment, the fully on state of the motor state table is PWM modulated to limit motor current and the off portion of that PWM cycle enters the intermediate state described herein during the "off" portion of the PWM cycle. In various embodiments, one or more, or each of the switching devices is operated in each of the fully-on, fully-off and intermediate states, by a respective driver circuit. In one embodiment, the heating mode of all switching devices is temporarily turned off when a large magnitude of current is to be directed to the traction motor in order to maximize vehicle performance.

By this means, expensive resistor-based heating devices, such as electrical PTC (Positive Temperature Coefficient resistor) air heaters, electrical PTC immersion coolant heaters and heat pumps in the embodiment where an inexpensive vehicle has no air conditioning, can be completely eliminated for the purposes of warming occupants in the vehicle cabin, or the energy storage system, substantially decreasing the cost of such electric vehicles that are produced in high volumes and making electric vehicles more accessible to lower income households.

Figure 7:
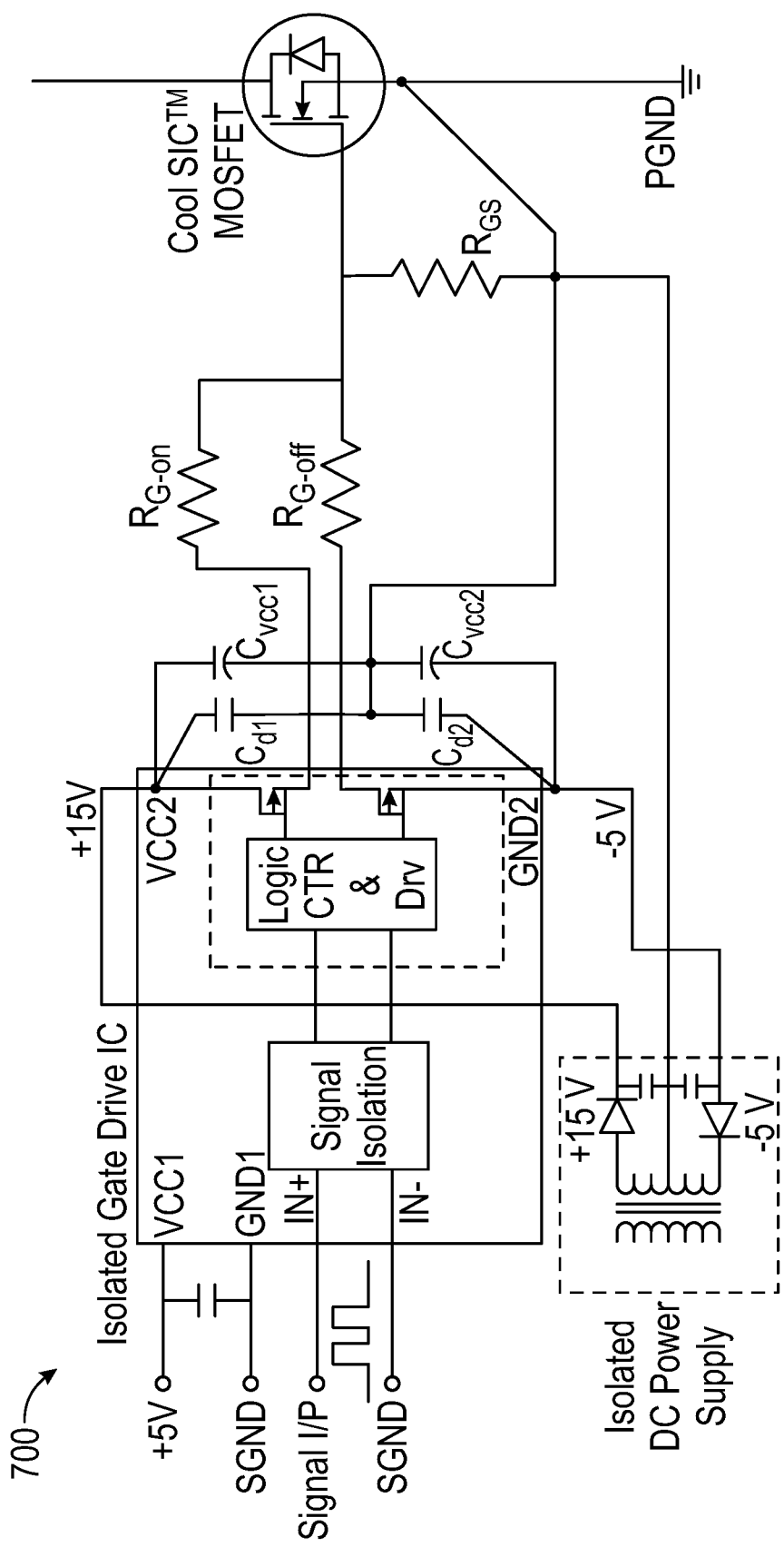
FIG. 7 depicts an example isolated MOSFET drive circuit in accordance with some embodiments.
Figure 9:
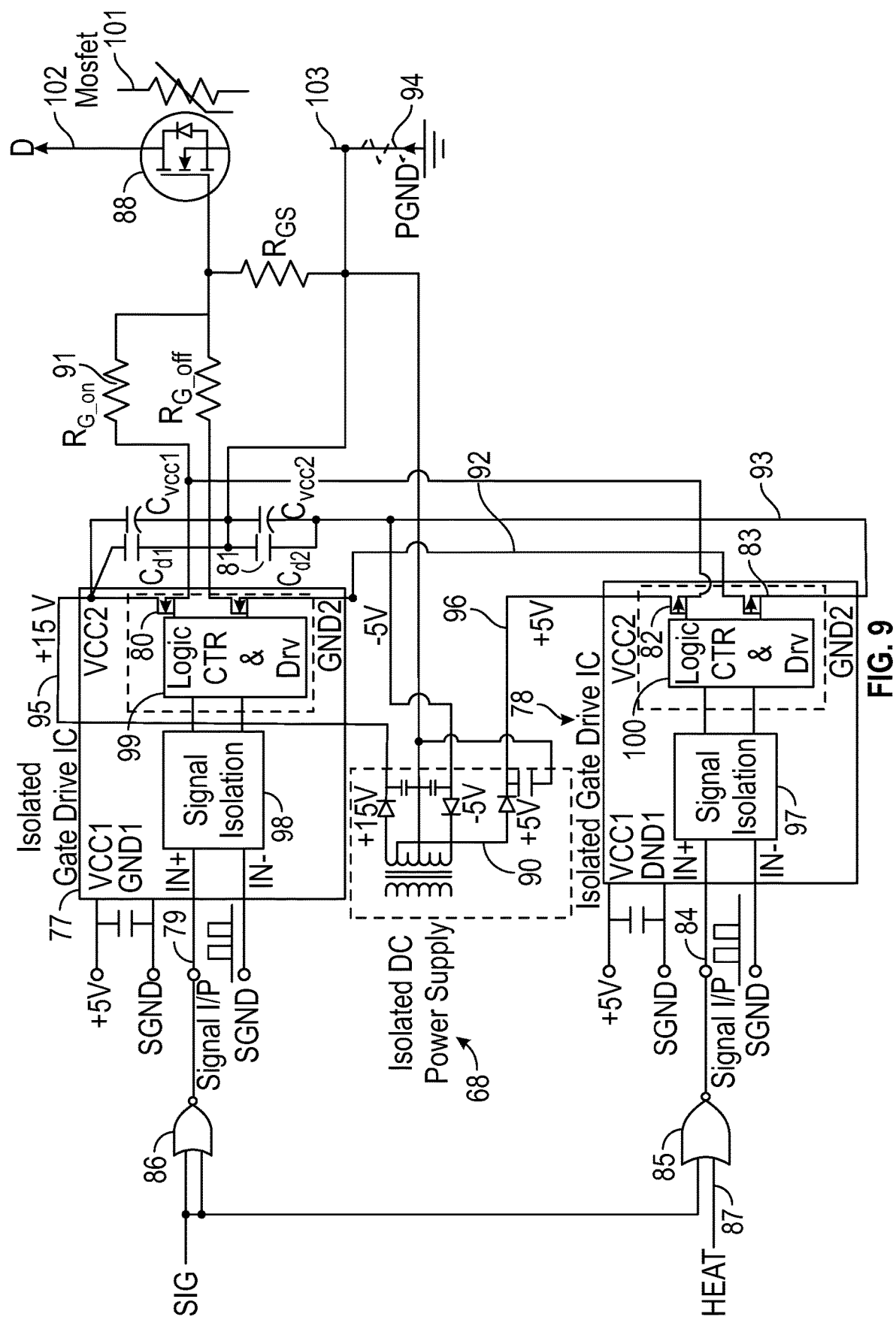
FIG. 9 depicts an embodiment of a drive circuit for an electric vehicle heating system in accordance with some embodiments.

One embodiment, shown in FIG. 9, uses the drive circuit 700 of FIG. 7 as the basis for implementation. A theoretical device in this embodiment, as previously described herein, has characteristics of saturating at a channel current of 4 amps at a $V_{gs}$ of +5V. The driver circuit in FIG. 9 may be implemented in a number of ways, and further driver circuits with related functionality readily devised, by those versed in the art and the embodiment in FIG. 9 is by no means the only way to implement the embodiments, where it is desired to either use a device, or a plurality of devices, as a heat source, or as a low loss switching device, based on a commanded state. In one embodiment, the HEAT– signal is used where the switching device is used as a heat source when HEAT– is active, low, and as a high efficiency switch with low losses when HEAT– is deactivated, high. As in FIG. 7, one embodiment of gate driver IC 77 is more or less identical, except that the source of device 81 is disconnected from the devices in FIG. 9 and is instead connected to the drain of device 83 in driver IC 78. Device 83's source terminal is then connected the way device 81 was connected in drive circuit 700 of FIG. 7.

In operation, when HEAT– is inactive, high, at 87, when high efficiency and no heating are desired, device 83 turns on and enables a path to –5V for any devices connected to its drain terminal. This effectively creates the same connections as in drive circuit 700 of FIG. 7 for device 81. Device 78 otherwise ignores the SIG signal which is meant to turn MOSFET 88 on and off. As such, a high on SIG will turn on device 80, connecting the gate of MOSFET 88 through the $R_{g\_on}$ gate resistor to +15V provided to IC 77 by isolated power supply 89. In another embodiment, this voltage may be generated by use of a charge pump circuit. Device 81 is turned off so the gate of MOSFET 88 charges quickly up to +15V with respect to its source 103 which is the 0V reference of the isolated power supply 89. A low on SIG will turn off device 80 and turn on device 81, connecting the gate of MOSFET 88 to –5V through $R_{g\_off}$, device 81, and the already on, by HEAT– being high, device 83. This fully turns off MOSFET 88 by connecting its gate terminal to –5V. The MOSFET therefore behaves identically to the MOSFET in drive circuit 700 of FIG. 7 in response to SIG and when HEAT– is inactive (high). In passing, note that the "PGND" designator of FIG. 9 and the ground symbol merely designate the negative-most terminal of the circuit block as it would appear, for example, as either the high side or the low side switching device in a two level inverter architecture, or as for any switching device in a switching architecture.

When HEAT– is low, the embodiments cause the MOSFET 88 act as a lossy device when off as the result of SIG being low, yet still the MOSFET turns on fully when SIG is high. When SIG is high, IC 77 functions as previously described by driving the gate of MOSFET 88 with +15V turning it fully on. Device 81 is off so the gate of MOSFET 88 cannot be connected to –5V. When SIG goes low, signaling an OFF state for MOSFET 88, HEAT– modifies that state to be interpreted as "slightly on". Device 80 turns off, disconnecting +15V from MOSFET 88's gate. Device 81, however, is turned on, connecting the gate of MOSFET 88 to the drain of device 83. Because SIG's low signal is effectively inverted by NOR gate 85, device 83 is turned off, preventing the connection from the gate of MOSFET 88 from being completed to –5V through device 81. SIG being low, and being effectively inverted by NOR gate 85 will turn on device 82, connecting the gate of MOSFET 88 through $R_{g\_on}$ to +5V. Recall in the embodiment that when MOSFET 88's gate is at 5V, it sets up a saturated channel at 4 amps, no matter what voltage is applied across the MOSFET's source and drain terminals, MOSFET 88 is not fully turned off, as MOSFET 88 was when –5V was applied as a control voltage to its gate as practitioners in the art would do to operate MOSFET 88 in the fully-turned-off state to achieve "high efficiency" in the inverter itself, but rather MOSFET 88 is partly turned on. In one embodiment, the voltage applied at intermediate state voltage supply 96 by supply 89 is variable, in another embodiment, the current through MOSFET 88's drain to source path is monitored (e.g., with a current sensor 94) and the power supply applied to intermediate state voltage supply 96 is adjusted to a regulated current value to achieve maximum safe power dissipation in MOSFET 88 to effect heating of its cooling loop.

In these embodiments, and variations thereof, the control voltage for the MOSFET 88, e.g., voltage at the gate, is supplied as intermediate state voltage supply 96 and is adjusted based on sensing current of the MOSFET 88. Alternatively, such adjustment could be made based on sensing temperature of the MOSFET 88, for example with a temperature sensor or other sensor. The OR gate 86 is present to match propagation delays with NOR gate 85 in one embodiment. In a single isolated gate driver embodiment, the OR and NOR functions would be absorbed in a combined logic and control block 99, 100. Any requirement to synchronize the changing of states of HEAT– with respect to SIG is easily implemented if needed by those versed in the art. A consolidated driver device, or a plurality thereof, combining the functions of 77 and 78, would have HEAT– and SIG inputs which are isolated (functionally 97, 98) before going into the logic and control blocks. Device 83 is not necessary in a consolidated driver device and can be eliminated if the logic and control block implements its effective logical AND function. Device 82 would coexist in the same isolated gate driver IC as device 80, with one connected to the full drive supply, typically 15V to 20V, and one connected to a circuit that produces a control signal that creates a current limiting channel in MOSFET 88. Note that the partial on-state of MOSFET 88 can be achieved by connecting to a plurality of isolated voltages, providing quantized steps in heat generation, or it can be continuously variable under either open or closed loop control such as proportionality to the drain to source current, device temperature, or coolant temperature, and can be limited, or controlled, by device temperature in some embodiments. In some embodiments, the proportional component being measured for loop control is sampled and held.

Some inverters, like the one in the original Model S, use a plurality of transistors as switching devices in each phase leg, so another embodiment would simply switch one, or several, device(s) partially on instead of all of them if the $R_{ds}$ of an individual device when fully turned on is high enough or if the channel current is sufficiently throttled within the power limitations of the device(s). In another embodiment, a smaller, high $R_{ds}$ device, or plurality thereof, is incorporated as part of the high power output transistor array, providing an inexpensive means to move thermal energy into the coolant while adding current switching capacity. In an alternate embodiment, a different $R_{g\_on}$ and $R_{g\_off}$ resistor can be switched in, increasing the device transition time through the high power dissipation region, increasing its power during switching of the device to intentionally generate heating in the switching device as a commanded switching state.

If the MOSFET 88 in FIG. 9 was connected to a 400 VDC power source by another switching device on the opposite of the high or low side of the phase leg 70, 71 or 72, (e.g., driver in FIG. 5A modified for MOSFETs in place of IGBTs, e.g. MOSFETs 58, 59, 60, 61, 62, 63) to which MOSFET 88 is connected, with the embodiment's MOSFET characteristics, the +5V applied to the MOSFET 88 gate would enable 4 amps of current to flow in the device and with a 400V applied across the device, it would dissipate 1600 W into its cooling means. It should be appreciated that the cooling system is capable of transferring this maximum power by such means as coolant flow rate, pump speed, heat transfer surface area, materials selection, or by dividing and conquering the problem into multiple switching devices. In one embodiment, multiple higher $R_{ds}$ devices are each used for the low loss switching function and one or only a few devices are selectively turned on to force them to dissipate more power. By pulling HEAT– high, inactive, MOSFET 88 acts as the high efficiency, relatively low power dissipation, switching device. With 6 devices in the three-phase, two level, inverter configuration and with the motor in an off state, in one embodiment three of the MOSFETs would be partially on, acting collectively as a 3*1600 W=4800 W heat source to produce four residential space heaters' worth of peak, high rate passenger cabin heating, during the time the MOSFETs are in the heating state. PWM control of HEAT– in one embodiment, and a variable or quantized isolated power supply voltage 90 in another embodiment, results in lowering of power dissipation as passenger cabin heating requirements level off to one or two kilowatts for a warmed cabin.

The embodiments can be implemented for an approximate added cost of $20, while also eliminating between $500 and $1000 worth of an EV's resistor-based heater modules, which include heating elements, packaging, high power driver electronics, control electronics, pumps, reservoirs, surge tanks, hoses and pipes, with typically one set of those heater modules and their support systems for occupant coolant heating and another set for energy storage system heating. In various embodiments, the amount of power dissipated, and corresponding heating produced in heat mode of operation of a switching device is either designed for or controlled to not exceed a power rating of the switching device, so that expected switch lifetime (and inverter lifetime) is preserved to levels appropriate to expected vehicle lifetime.

Figure 10:
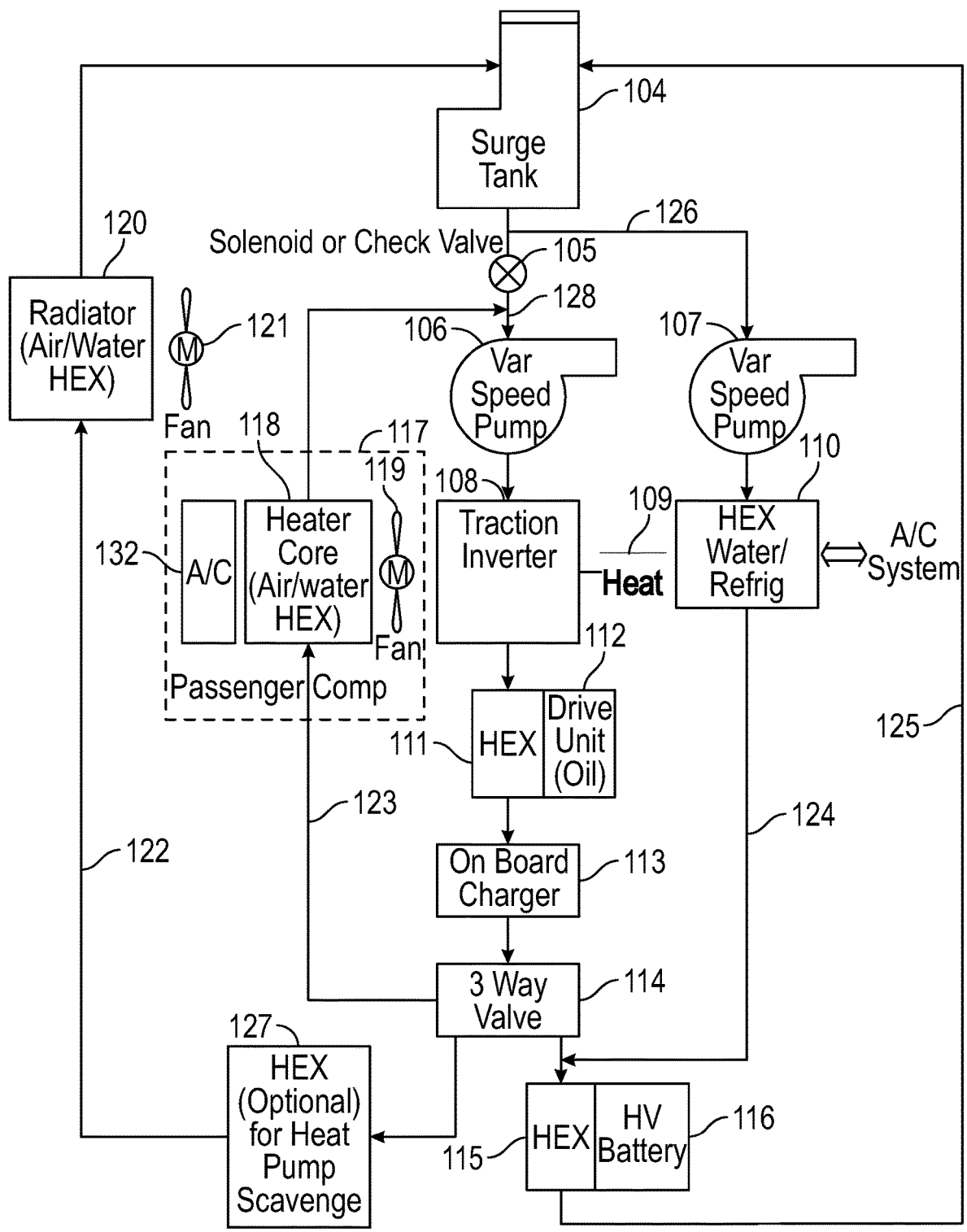
FIG. 10 depicts an embodiment of an electric vehicle heating system that uses the drive circuit of FIG. 9 or variation thereof.

FIG. 10 shows one embodiment of an implementation of the MOSFET-heated coolant loop. In a second embodiment, the Onboard Charger (and/or the DC-DC converter implied in that block of the diagram) is placed in the loop between pump 106 and the traction inverter 108. In one embodiment, the traction inverter 108 has heating-mode capable MOSFETS, turned on by the HEAT– signal 109. Operation is as follows, though other implementations of the electric vehicle heating system, and the sequence of, or presence or absence of devices in the loop, are possible to achieve the same outcome. The coolant in the reservoir, "surge tank" 104, feeds a variable speed coolant pump 106 through an opened valve 105. Valve 105 is optional and simplistically prevents backflow of heated coolant into the surge tank or coolant loop 126. In another embodiment it can be a check valve, in another embodiment a check valve that is closed by mild forces such as springs or magnets, and in another embodiment, it is omitted altogether where gravity is exploited or flows are designed and managed. Pump 106 then pushes coolant into the traction inverter 108, which contains at least one of the devices previously described that can produce heat in the presence of an activating command or signal, in this embodiment HEAT– 109.

Traction inverter 108 then passes heated coolant, in this embodiment the system strives for at least 130 degrees Fahrenheit at the inlet 123 of heater core 118 by controlling the HEAT– signal and pump flow rate, in other embodiments at higher temperatures such as 160° F., 170° F. or 180° F., to heat exchanger "HEX" 111 which serves to exchange heat with the electric motor and gearbox cooling and lubricating oil 112 in the vehicle drive unit(s). In some embodiments, multiple traction inverters 108 and drive unit HEX 111 are present and multiple coolant interconnections are possible. Suffice it to say that motor windings and gearboxes are tolerant of higher temperatures, so they are generally preceded in the coolant loop(s) by the inverter electronics. The heated coolant from HEX 111 then is routed to the Onboard Charger 113, which also includes the vehicle's DC-DC (~12V accessory power) module 113. In some embodiments these are separate boxes, in one embodiment they are combined, much as they are in the Nissan Leaf. Note that in vehicle operation the onboard charger is turned off and only the DC-DC module is active in most foreseeable instances. On-the-move-charging is possible (think air-to-air refueling), though, and the operation of the Onboard Charger 113 while the vehicle is in motion would simply generate more heat in the coolant and require less heat to be produced by the heating-enabled MOSFETs (typically only in the traction inverter), assuming the heat-producing MOSFET is not implemented in the Onboard Charger (or DC-DC converter) as an embodiment, which it could be in a further embodiment. In one embodiment, the external charging cable is liquid cooled and forms part of the Onboard Charger's heat generating elements. In one embodiment, an external charger produces excessive heat by any means, including by the method(s) described herein, or has a means of cooling, and heat is transferred to/from its coolant by means of a coolant-isolating HEX during external high speed DC charging to the vehicle's coolant to either warm the energy storage system, the occupant cabin or any combination thereof.

In one embodiment of FIG. 10, heated coolant is then routed from the onboard charger, 113, in one or more of three directions by a three-way valve 114. In another embodiment, a three way fitting with flow restrictors could be used at 114. In yet another embodiment, one or more of the three branches can have variable speed pumps to preferentially route higher or lower coolant flows in their path. In yet another design, flows are engineered to produce higher and lower flows in the different branched by such methods as cross-sectional areas and by use of flow restriction or enhancing devices and methods. For the purposes of heating the passenger cabin 117, heated coolant flows in line 123 to the vehicle's heater core, which is a liquid to air heat exchanger, which is assisted in transferring thermal energy to the passenger cabin air by variable, or quantized, speed fan 119. This process transfers heat from the coolant, to the occupant cabin air, which is then returned to junction 128 to complete the heating loop for the cabin. Any residual heat is reused in the next cycle of the loop, reducing the amount of heat needing to be generated by the heating switching devices incorporated into the traction inverter 108. If the cabin heating is included in the thermal accounting, the traction inverter becomes 100% efficient in that none of the energy from the battery is intentionally dumped overboard via the radiator 120 into the environment, unlike would be the case with prior implementations of traction inverters by those versed in the art and where heat pumps do not harvest the "waste" heat.

Another path the heated coolant can take after exiting the Onboard Charger 113 of FIG. 10 is through the heat exchanger 115 for the energy storage system, a high voltage lithium-based battery 116 in one embodiment. This is needed in cold ambient temperatures or for "preconditioning" the battery to reduce its internal resistance to enable faster, higher rate, battery charging or discharging in one embodiment. For warming these batteries for greater efficiency, the temperature only needs to be a minimum of 65F in this embodiment, though this temperature could vary depending on battery technology. For fast charging, or for higher discharge rates for high vehicle acceleration, in one embodiment, the battery is pre-heated to 130° F. to lower its internal resistance.

The battery HEX 115 of FIG. 10 is also fed by a second coolant loop, in one embodiment, for the purposes of either moderating the hot coolant exiting the Onboard Charger 113 and 3 way valve 114 if the cabin heater is on (in this embodiment, having a coolant inlet temperature of at least 130° F. at the heater core 118) to warm the battery to some intermediate temperature (mixing hot and cold as for bathwater—lithium-ion batteries like the same temperatures humans do), or actually cooling the battery during charging or extremely hot ambient conditions. This second loop feeds coolant from surge tank 104 via branch 126 to a variable speed pump 107. The output flow of pump 107 then feeds a coolant/refrigerant heat exchanger, HEX 110, which allows an air conditioning system to cool the coolant when it is optionally activated. If inactive, the coolant simply passes through the HEX with its temperature relatively unchanged—this would be the case if the need to mix ambient temperature coolant with heated coolant arises for battery conditioning, typically when the cabin heat is on. If the cabin heat is not on, the heat from the heated switching devices can be modulated to turn the coolant temperature down, though some "cold" coolant mixing may still be needed. Temperature sensors or other thermal sensors in the system are not shown in FIG. 10 and their placement should be obvious to those practiced in the art and readily understood for various embodiments in keeping with the teachings herein. Hot and cold/cooled coolant are mixed at the inlet of the battery HEX 115 to heat or cool the battery to desired temperatures, then the coolant is returned to the surge tank 104.

Another path the heated coolant can take after exiting the Onboard Charger 113 of FIG. 10 is via loop 122 to a radiator 120, which exchanges heat from the coolant to ambient temperature. This loop would typically be used if no cabin heating is needed and where the vehicle electronics, such as traction inverter 108, DC-DC converter 113, or traction motor oil 112, need cooling. Note that in one embodiment, HV battery 116 cooling, apart from using the air conditioner 132 HEX 110, is facilitated by activating this loop to cool the surge tank coolant which is also part of the battery cooling loop 126, 124, 125. The exchanger 120 efficacy is assisted by the vehicle's airstream when moving (shutters 18 in front of the radiator are optional to improve aerodynamic efficiency and are not shown for simplicity) and by a variable speed fan 121. The cooled coolant then is returned to surge tank 104. In some embodiments, a heat pump is used to scavenge heat sources for heating passenger cabins and modules, like the energy storage system, so an optional placement of a heat exchanger HEX 127 can be inserted into this coolant loop.

For systems like the Chevy Bolt EV, the embodiments described herein add one (optional) 3 way valve and eliminate: one pump, a 2.5 kW battery heater 5, its controller 8, and a 7.5 kW cabin heater 24 (GM 42691833 MSRP is $760.49) and its controller 25; resulting in reduced: vehicle weight, complexity, leaking coolant failures, and vehicle BOM costs by several hundred dollars per unit. In the case of the Nissan Leaf, elimination of the cabin heater (P/N B7413-00Q0K) MSRP, alone, is $1421.02. Approximately double the cost of the components can be realized as a reduction in sticker price of the vehicle, or the savings in cost can go directly to operating margins of the OEM, likely lifting those operating margins by very significant, double digit percentages.

For systems like the Tesla Model S, the embodiments described herein eliminate one pump, a battery heater and its controller 44, and a cabin heater 41. Tesla does not publish its parts prices, but those cited from the Chevrolet Bolt EV may serve as close approximations.

With reference to FIGS. 1-15, it should be appreciated that variations with other types of switching devices, other traction inverters including multilevel inverters and various numbers of phases, other driver circuit topologies including cascode amplifiers and stacked devices for high voltage capability, and other types of transistors and controlled switches, various types of sensors, various energy storage systems, various controllers and control algorithms for operating driver circuits and traction inverters and electric motors of various types are readily considered and further embodiments devised therefrom. Various paths and components for selectively directing switching device derived heating produced as described herein, in various vehicle systems, are readily devised in further embodiments, in keeping with the teachings herein.

In the event the inverter is limited in the power its switching devices can dissipate, in one instance 1 kW per switching device in the inverter and in another embodiment a total of 3 kW of heat generation, some embodiments can also invoke the "third state" in the vehicle charger, in some embodiments while the vehicle is not even charging, which can generate another kilowatt of heat energy with one or more switching devices operating in the third state despite the charger not switching its output devices. Further embodiments can employ other modules where high power switching devices are present and liquid cooled, whether onboard the vehicle or associated with the vehicle occasionally such as during charging. A separate command or signal equivalent to HEAT− can be used to control each module individually in one embodiment, in any plurality set, or collectively as one signal. The components being driven by the switching devices can be in their "off state" and still have heat generated by the switching devices that are "off". A signal can be implemented in either hardware or as a software state. In another embodiment, the contribution of each respectively is apportioned by controlling its percentage of the aggregate contribution of all heat sources.

Various embodiments could have an immobilizer. For example, an added gate in the "SIG" signal path can disable a traction inverter by means of a signal, one embodiment using an AND gate, with IMMOB− as an input. In another embodiment, the SRS (airbag) deployed signal is also used as an input to the AND gate, serving to also immobilize the vehicle in a crash. In some embodiments, the immobilization is latched logically, such that an extraordinary effort is required to reset the state of the immobilization to enable operation again. The "signal" and the logic can also be implemented purely in software or firmware in the inverter. The IMMOB− signal is only inactive (high) when a state is entered where a sequence such as a number, symbols, or letters, comprising a password, passcode, or security code/PIN has been correctly entered, in one embodiment. The control circuit in the inverter may be connected to receive this information by any communication means including CAN or other bus protocol messages, radio link such as Bluetooth or Wi-Fi, or by wired connection. Included in this is a means to enter and store the known code in the inverter from time to time and a means to restore that code to a "backdoor" code to allow entry reentry or initialization of the code. That means could also include a restricted, code entered, access protection. Such means can be constructed by software executing on a processor, firmware, hardware or combination thereof. The enclosure and construction of the inverter is such that extensive time is required (e.g., by a hostile user) to access any means to bypass the immobilization circuitry or software. In another embodiment, a signal is received from the SRS (Supplemental Restraint System, aka "airbags") crash detection system to disable operation of the inverter until it can be re-enabled by authorized service technicians or the factory.

Figure 11:
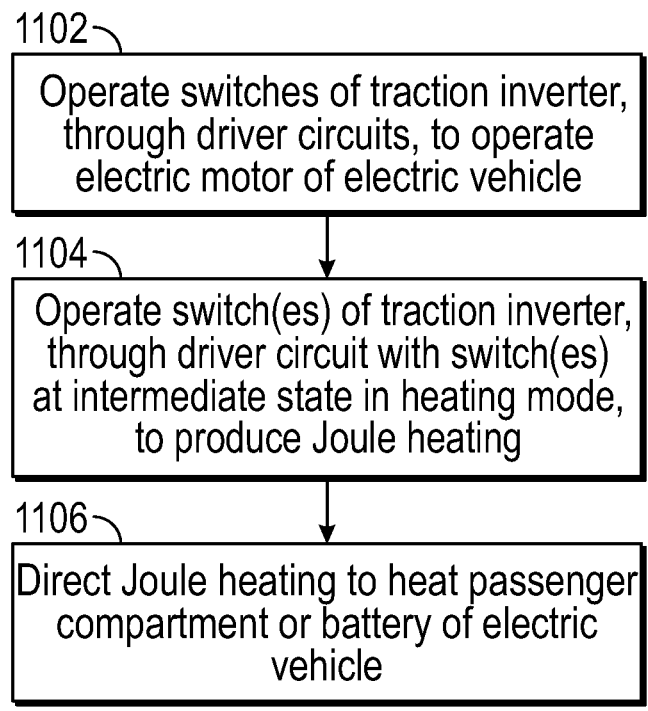
FIG. 11 is a flow diagram of a method for an electric vehicle heating system in accordance with some embodiments.

FIG. 11 depicts a method that can be practiced by embodiments described herein. More specifically, the method can be practiced by electronic circuitry, processors (including controllers), and various combinations of software executing on a processor, firmware, and hardware as readily devised in keeping with the teachings herein. The method can be embodied in tangible, computer-readable media having instructions for execution by a processor, or plurality thereof, for example a processor in an electric vehicle heating system as described herein.

In an action 1102, the system operates switches of a traction inverter, through driver circuits, to operate the electric motor of an electric vehicle. See, for example FIGS. 6-9 for various traction inverters and driver circuits, and variations thereof. It should be appreciated that the references to operating switches of the inverter as the driver circuits may referred to as controlling, managing, etc., the switches. In addition, the embodiments are not limited to pulling heat from the traction inverter, as the embodiments may be extended to the charging circuitry for an energy storage system as discussed above.

In an action, 1104, the system operates one or more switches of the traction inverter, or the charging circuitry of the energy storage system, through the respective driver circuit(s), with the switch(es) at an intermediate state in a heating mode, to produce switching device heating. See, for example FIGS. 6-9 for various traction inverters and driver circuits, and variations thereof, and description of an intermediate state and heating mode and related mechanisms.

In an action 1106, the system directs switching device heating produced to heat the passenger compartment or the energy storage system of the electric vehicle. See, for example FIG. 11, for a fluid path, selection valves and heat exchangers suitable for various embodiments of directing such switching device heating, and variations thereof. While the embodiments disclose selecting a path for the fluid or heating means it should be appreciated that this is not meant to be limiting as the path may be determined through a passive manner, such as a pump being on or off as opposed to an active manner such as valve movement. In some embodiments the heat exchanger may include ductwork supplying air flow for cooling or warming a passenger cabin and/or energy source.

In some embodiments a method of heating a system requiring a narrow range of temperature operation in environments requiring heat generation is provided. The method may be integrated into any power switching apparatus, including such topologies as switching power supplies, DC motor controls, power factor correction circuits, motor drivers, actuator controls, etc. The apparatus may be integrated into satellites or another suitable apparatus that may utilize the heating embodiments described herein. Switching devices for the apparatus operated through a driver circuit may be utilized as described above. At least one of the switching devices of the apparatus may be operated though the driver circuit with the switching device at an intermediate state between fully-turned-off and fully-turned-on, in a heating mode to produce heating, as described above. The heating produced in the heating mode is directed or controlled to heat the apparatus. The switched device, or its load, does not need to be "on" for heat to be produced. It should be appreciated that in some embodiments, the device may be in a not fully on state for heat production and is not limited to a not fully off state. That is, the embodiments extend to not fully driving the devices so that resistive channels are heated by $I^2R$ losses vs. channel throttling $V*I$ losses.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

In one embodiment, the Traction Inverter 108 and On Board Charger 113 of FIG. 10 are integrated to minimize component count, complexity and cost and to improve system reliability. The function of the On Board Charger (OBC) is to rectify and convert incoming mains alternating current, such as the 120 VAC power outlets used in North America, to an energy storage system (such as a High Voltage Battery) charging direct current (DC) at the typically higher voltages found in such systems such as 400 VDC.

Figure 12:
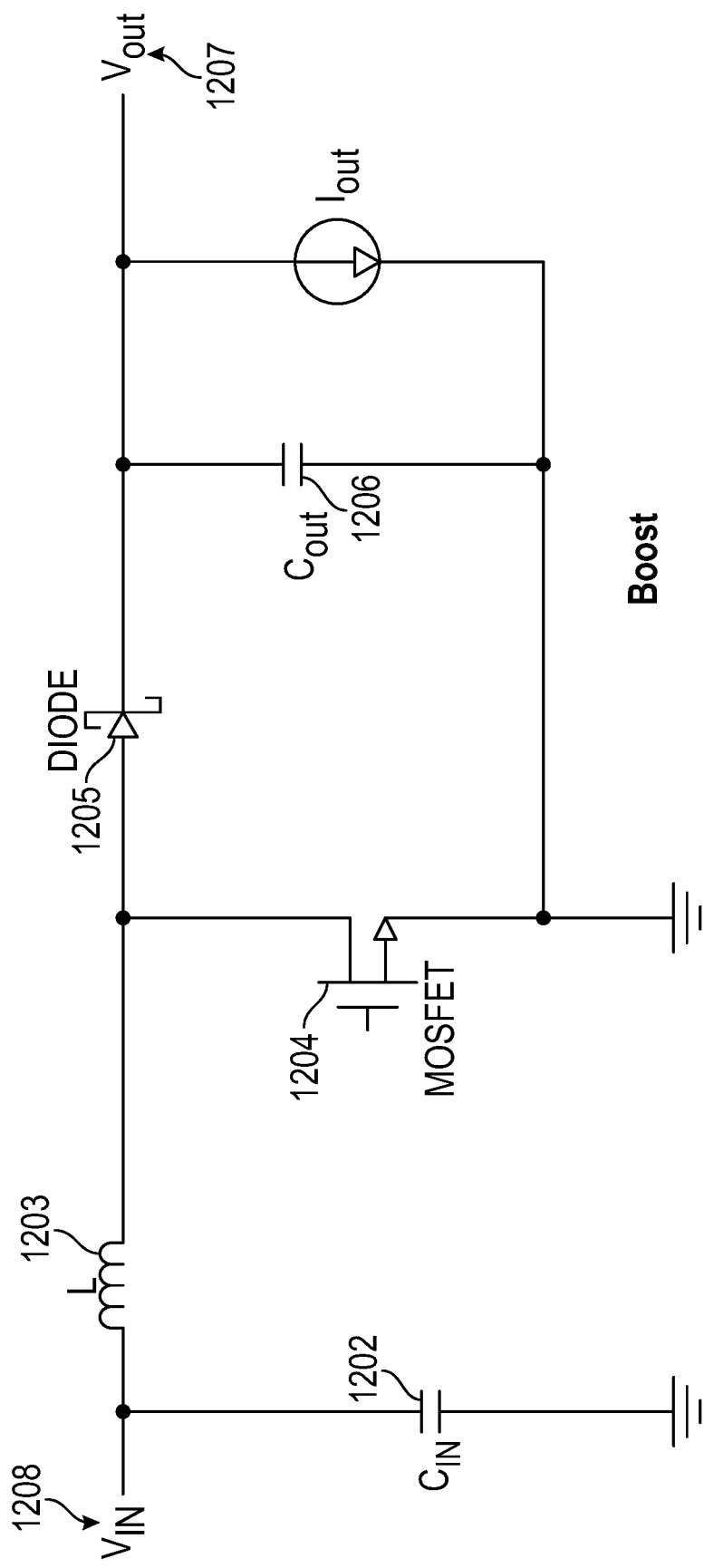
FIG. 12 depicts a boost converter, the functionality of which is achieved in an embodiment of a traction inverter.

FIG. 12 depicts a boost converter, the functionality of which is achieved in an embodiment of a traction inverter, as described below. To understand how the functionality of a boost converter is achieved through implementation in the traction inverter embodiment depicted in FIG. 5B, the functionality of the boost converter is first described. One implementation for charging a high voltage battery from an available lower voltage source, by those versed in the art is through the use of the "boost converter" of FIG. 12. This boost converter embodiment has an input capacitor 1202, an inductor 1203, a switching device 1204, a diode 1205, an output device: such as a battery or capacitor 1206 that converts charge to an output voltage 1207; and a DC power source with input voltage 1208, though other boost converter circuit embodiments can achieve the same result. The basic operation of a boost converter is that a switching device 1204 is turned on, causing a current to flow in inductor 1203 from the input power supply voltage 1208 and the input capacitor 1202 to ground. Diode 1205 blocks current from flowing from the output voltage 1207 and output capacitor 1206 to ground when switching device 1204 is turned on. The current flow in inductor 1203 establishes a magnetic field in the inductor that stores energy. When switching device 1204 is turned off, that magnetic field in inductor 1203 causes current to continue flowing in the inductor 1203, in the same direction through it as when the switching device 1204 was turned on, as the magnetic field collapses as current is drawn by a downstream device. That current charges the output charge storage device (a capacitor 1206 or battery in one instance, or both in another instance), increasing its voltage to where the output voltage 1207 becomes the sum of the input voltage 1208, and the voltage being created by the accumulating charge in the output capacitor (or battery or both) from the inductor current. The output voltage 1207 is "boosted" above the input voltage 1208 by the pumping action of switching the current on and off in the inductor 1203 and alternating its connection between ground and the output charge storage device, in this example output capacitor 1206.

Figure 5B:
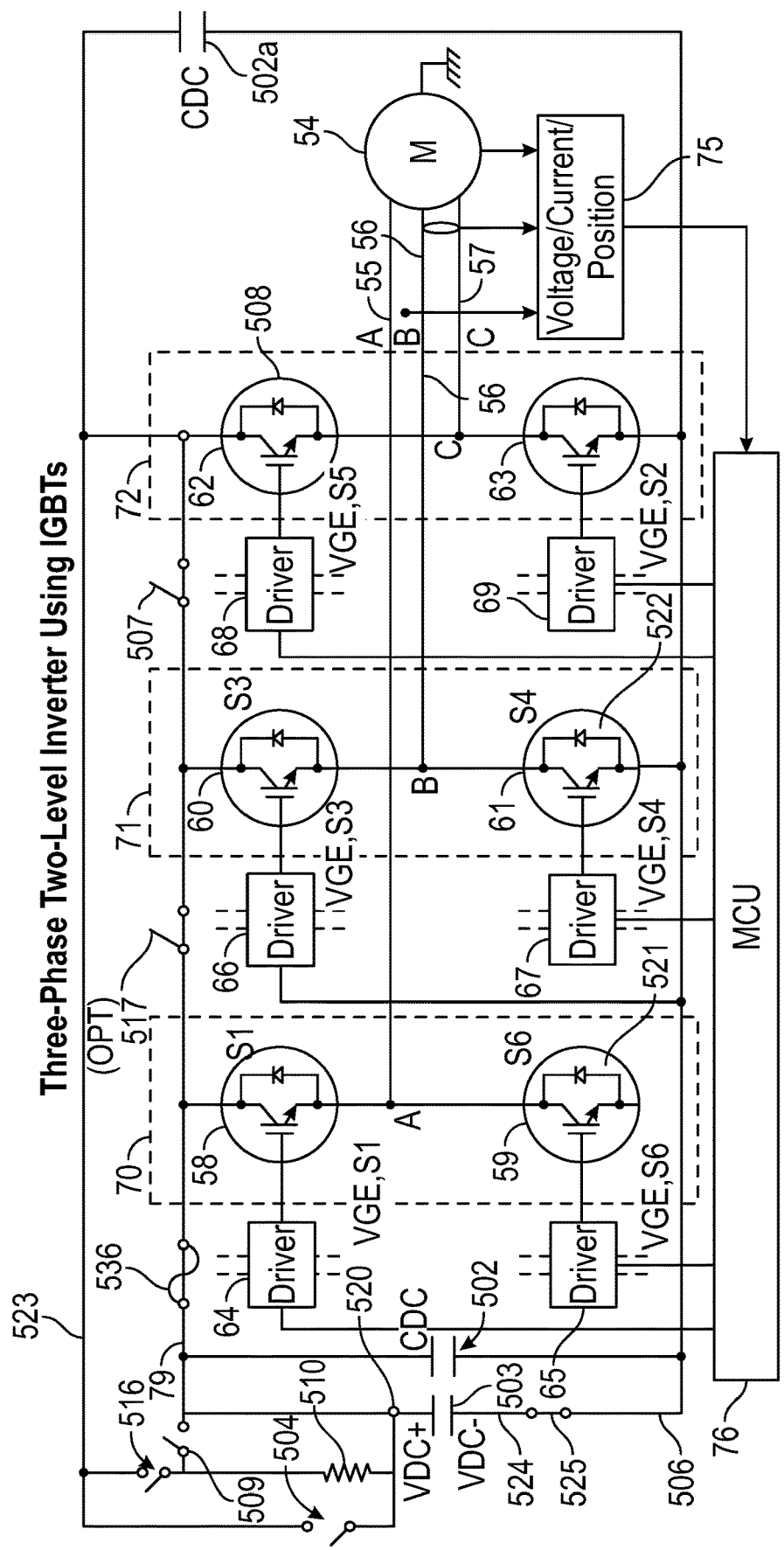
FIG. 5B depicts a further example three-phase traction inverter, as a modification of the three-phase traction inverter of FIG. 5A and further embodiment.

Referring to the traction inverter of FIG. 5B, one system embodiment of the traction inverter that has the functionality of a boost converter exploits the fact that charging a vehicle generally means the vehicle is not moving, that its traction motor inverter is not in use and would designate the following devices in order to use the traction inverter as the boost converter of FIG. 12, minimizing complexity, weight, cost, enclosures, cooling systems, and cooling loop plumbing and its associated leaks and failures. That is, in one embodiment, the traction inverter of FIG. 5B operates in one mode as a traction inverter, and in another mode operates as operates and has functionality of a boost converter, i.e., implements a boost converter. The boost converter input capacitor, in FIG. 12, capacitor 1202, is implemented as "CDC" capacitor 502 of the traction inverter in FIG. 5B. The input capacitor "CDC" 502 can be embodied by multiple capacitors, in one instance having one capacitor per phase leg 70, 71, 72. In FIG. 5B, only the capacitors 502a for phase leg 72 and capacitor 502 for phase legs 70, 71 are shown for convenience, though in another embodiment there are two capacitors in place of the one capacitor 502 in FIG. 5B, i.e., there is one or more capacitor for each phase leg 70, 71, 72. The inductor of the boost converter, in FIG. 12 the inductor 1203, is implemented as motor windings "ABC" 55, 56, 57, where, in one embodiment, windings 55, 56 A and B are in parallel with each other and then series connected to winding 57 C, and in further embodiments other parallel and series combinations of windings implement the inductor 1203. The switching device (of the boost converter, in FIG. 12 the switching device 1204) is implemented as switching device 63 of the traction inverter in FIG. 5B, repurposed. In various embodiments, MCU 76 is programmed to operate various combinations of drivers 64, 65, 66, 67, 68, 69 to arrange circuit connections as described above, and operate the traction inverter in FIG. 5B in one mode as a traction inverter related to the embodiment in FIG. 5A, and in another mode as a boost converter.

Diode 1205 of the boost converter in FIG. 12 is present in the inverter embodiment in FIG. 5B as the body diode 508 shown in switching device 62, but is toxic to a boost converter in that any added voltage on the boost converter's inductor output node of winding 57 would forward bias the body diode and clamp it to the voltage on the "DC Link" capacitor 502 plus the drop across the body diode. One embodiment, depicted in FIG. 5B, adds a switch 507, known as a "contactor" (effectively a heavy current relay) to those versed in the art, to break the current path from the body diode of the switching device 62 to the DC link capacitor 502. With the switch 507 open, body diode 508 creates diode 1205 of the boost circuit which, when switch 504 is closed provides a path for current from the inductor (motor windings) output of winding 57 to the battery 503, and capacitor 502a in the preferred embodiment, which is functionally operated as an output device of the boost converter of FIG. 12, capacitor 1206. Note that switch 507 also serves to disconnect the DC link capacitor 502 from the ESS battery 503, allowing the voltages on each to be different. The boost converter then can operate as previously described in reference to FIG. 12 when provided with an input voltage in the input capacitor 502.

For expediency in describing various embodiments, FIG. 5A may be simplified and not show safety portions of the inverter and energy storage system circuitry. It is well understood by those versed in the art that the energy storage system (ESS), e.g. battery 503, should be disconnected for safety reasons when not in use. It is also well understood that an energy storage system may have further components such as a battery management system, and various arrangements and types of battery cells. One or more safety functions are accomplished in one embodiment, depicted in FIG. 5B, by introducing high current switches (in one instance, "contactors", which are very high current relays) 504, 505 proximal to the ESS, e.g., battery 503, positive and negative terminals. These switches 504, 505 are normally open, disconnecting the ESS from other high voltage wiring and circuits, and are generally only closed during vehicle traction inverter operation. Prior to closing switch 504, it is worthwhile noting that the DC Link capacitor 502, and also capacitor 502a in one embodiment, is discharged completely and presents an initial short circuit to the ESS. To remedy this, one may place a "precharge" resistor 510 into the circuit between the DC Link 502, and capacitor 502a in one embodiment, and connect or couple the ESS battery 503 by closing switch 505 and switch 507 (and optional switch 517 in one embodiment), then switch 509. These and other operations are managed by the MCU 76 in various embodiments. After capacitor 502 (and capacitor 502a in one embodiment) voltage charges to within range of the ESS voltage, switch 504 is closed and switch 509 is opened since the resistor is no longer needed. With the vehicle stationary and its traction inverter not in operation, switches 504 and 505 are open circuit to eliminate the presence of hazardous voltages outside the ESS safety housing.

For configuration of the traction inverter as a boost converter, switch 507 (and if provisioned in one embodiment also switch 517) is open and switches 505 and 504 are closed, enabling the ESS battery 503 (and in one embodiment, capacitor 502a) to be the output device, e.g., capacitor 1206 of the boost converter since the battery 503 is connected between the diode 1205, 508 cathode and ground 1209, node 506 VDC−. The traction inverter's components are fully utilized and only the addition of switch 507 (and optionally in one embodiment switch 517) is needed to turn the traction inverter into a boost converter ESS charger in one mode of operation, completely eliminating a liquid cooled On Board Charger (OBC) box and its associated support circuits and plumbing from the vehicle.

Figure 5C:
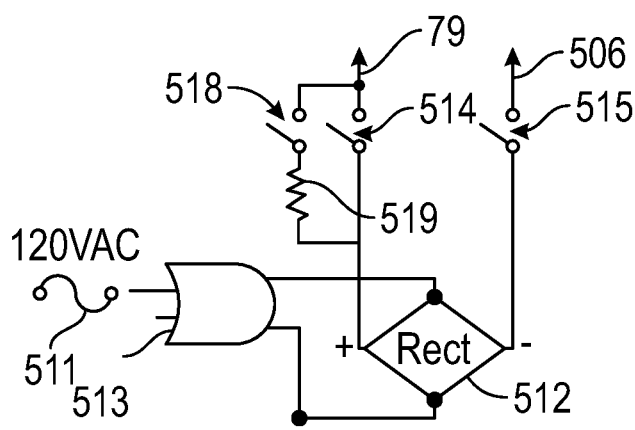

One item that remains is to establish an input voltage at the common node of inductor 1203 and the input capacitor 1202 of the boost converter of FIG. 12, as implemented through the traction inverter of FIG. 5C, which shows multiple embodiments.

In one embodiment shown in FIG. 5C, a mains source of 120 VAC input power 511 is delivered to a port on the vehicle by means of a J-1772 "Level 1" standard charging socket 513. In another embodiment, a covered NEMA 5-15 plug is used, which allows a simple grounded extension cord to connect the vehicle (provided ground fault detection and/or double insulation is built into the non-isolated boost converter circuit). In another embodiment, a "Level 2" 240 VAC mains power is delivered via the J-1772 connector. In a further embodiment, a DC voltage is provided on the input voltage pins of charging socket 513 where the system is polarity agnostic due to the presence of the rectifier 512. Power factor correction (arguably, the capacitive load of this boost converter is a good thing for utilities that install capacitors to compensate for heavy inductive loads from motors), fusing and other safety considerations, including ground fault detection which may be required on the vehicle or integrated into its EVSE (commonly known as the "granny lead"), are not shown for brevity in the drawing(s). An isolation transformer may be present in one embodiment to provide safety isolation of the vehicle and its components from the mains power source. The input power 511 is then converted to an absolute value, rectified, high-ripple "DC" sine wave by a rectifier 512. For simplicity of depiction, + and − terminals of rectifier 512 are indicated in FIG. 5C, but diodes or other circuitry of rectifier 512 are not shown and readily devised for embodiments.

During operation of the traction inverter of FIG. 5C as a boost converter and charger, the charging cycle/mode start is recognized by the system, in one embodiment by controller MCU 76, and switches 507 and 504 are initially open circuit disconnecting the third phase leg 72 and also in one embodiment capacitor 502a, and the DC link capacitor 502, from the ESS battery 503. Negative terminal ESS switch 505 is then closed, connecting the negative terminal of ESS battery 503 to node 506 VDC−. Closing AC input switches 514 and 515 to connect the AC input power 511 to the DC Link capacitor 502 in order to smooth the rectified AC to a DC voltage would result in massive inrush currents since the capacitor is a dead short initially due to having no charge on it. Therefore, before closing switches 514 and 515, the DC Link capacitor 502 is "precharged" in the same manner as it is when the traction inverter is initialized. Switch 509 is closed, causing the ESS battery 503 to push current through the precharge resistor 510, charging the DC Link capacitor 502 in a controlled manner (this typically takes about one second in traction inverter initialization, in one embodiment). Unlike traction inverter initialization, for the battery charging mode of the traction inverter the voltage on the DC Link capacitor is not brought within proximity of the ESS voltage, but rather to the fully charged voltage level it will achieve when its energy comes from mains power 511. Capacitors after a full bridge rectifier generally charge to the peak half-sine voltage, so in one embodiment, 120 VAC supplied becomes 120*root(2) or about 170V peak half-sine voltage. In one embodiment, the rectified AC input voltage is measured, the peak voltage is computed, and then the DC link capacitor is charged to that calculated value, more or less as readily understood. A slightly higher than rectified mains voltage simply means the precharge energy from the ESS was slightly excessive and will be returned to the ESS by the boost circuit prior to pulling any energy from the mains. In one embodiment, capacitor 502a is then precharged to the ESS voltage using switch 516 and reuses an idled precharge resistor 510 to throttle the rate at which it charges. After the target precharge voltages are achieved, precharging having been terminated by opening switch 509, and switch 516 in one embodiment, a slight delay is used to prevent component damage from unsafe operation between the ESS and the mains, and switches 513 and 515 are closed, applying rectified mains voltage to the DC link capacitor 502, producing a high quality DC energy source with input voltage 1208, e.g., node 79 VDC+ on capacitor 1202, 502 for boost conversion.

However, thus far in the description this high quality DC energy source on the DC link input capacitor 502, 1202 has not yet been connected to the boost inductor 1203. To review, one embodiment uses the multiphase motor windings as an inductor (e.g., the inductor 1203 of the boost converter of FIG. 12)—in the preferred embodiment the motor has three phases as windings 55, 56, 57. Motor phase leg as winding 57 has been designated as one terminal of the inductor 1203, being connected to the switching device 1204, 63 and the diode 1205, 508. By turning on switching devices 58 and 60, the inductor 1203, formed by a series connection of winding 57 C of one phase leg with paralleled winding 55 A of another phase leg and winding 56 B of yet another phase leg, is connected to the input capacitor 1202, 502 and input voltage 1208, input power 511. Further arrangements of phase legs, also called "phases", and windings apply to further embodiments.

With the traction inverter configured as a boost converter to provide current to charge the ESS battery 503, switch 1204, 63 is turned on and off as in classical boost converter operation. Prior to doing so, note that nodes of windings 55 and 56 are switched on to the voltage of node 79 VDC+ on the DC link capacitor 502. Switches 59 and 61 are normally off in the boost mode configuration. It should be noted that some chemistries of ESS battery 503 cannot be charged below the freezing point of water, so the ESS battery 503 must be warmed prior to charging. The source of such heat is through operation of the switching devices in a partially on or partially off state when they are normally off. So, as part of the cold weather ESS charge conditioning ("battery warming") where ESS charging cannot begin, one embodiment with a sufficient power reserve in the ESS battery 503 will use the Joule heating from partially on (the system is in traction inverter mode) switches 59, 61, 63 as previously described herein, to heat the battery to a target temperature, after which the inverter is reconfigured to its boost mode charger configuration. Should the ESS not have a sufficient power reserve to heat itself in traction inverter heating mode, in one embodiment a warming boost converter mode is entered where the ESS is disconnected by switch 504, the DC link is precharged to the peak rectified voltage as described previously and the rectified AC is applied by closing switches 514, 515. Switches 507, and in one embodiment switch 517, and switching devices 58, 60, and 62 are turned on (or in another embodiment, off) fully, or partially in another embodiment where higher power heating is possible. Switches 59, 61, and 63 can then be partially turned on or partially turned off to generate the heat needed to thermally precondition the ESS 503 using mains power 511.

In one embodiment, charging at a very high rate is desired and the ESS reaches minimum internal resistance for maximum rate charging at 130F to 140F. After maximum heating in the traction inverter mode, the boost configuration is then entered by precharging capacitors as needed, closing switches 507 and 504 in the previously described sequence and turning on switching devices 58 and 60. Heating is still possible to maintain, or ramp towards, elevated battery temperatures in one embodiment of the boost charger mode, while it is boost actively charging ESS 503, by partially turning on in one embodiment, or partially turning off in another embodiment, "unused" switching devices 59, 61.

It should also be noted that each of the switches 58-63 in a traction inverter are capable of conducting hundreds of amps, as are the motor's 54 windings, and that the body diodes 508 et al are the primary elements diverting energy from the motor to the ESS during regenerative braking, meaning this novel boost converter based on the traction inverter could also conceivably operate at those high power levels without any additional cost or complexity. Significant heat may also be available from the motor windings due to resistive or iron losses during such operation—the latter may be emphasized by increasing the switching frequency of the boost converter, or reduced by lowering the frequency of the converter in addition to increasing or decreasing the current in the windings of the motor.

In one embodiment, having one motor winding in series with two parallel windings is not acceptable to practitioners. We add an optional switch 517 to isolate switching device 60 in boost converter mode and only turn on switching device 58, energizing winding A at 55 and switching the two series connected motor 54 windings 55, 56 A & C at winding 57 C with device 63. Winding B, node 56, and switching device 60 are all unconnected. The downside here is that device 59 is primarily available for heating, while 61 would be a parasite on the boost converter efficiency if partially turned on since it would be powered from the motor winding instead of by the DC Link capacitor 502 and node 79 VDC+ via switching device 60 being turned on.

The traction inverter can functions normally and as described previously herein, including its heating functionality, whenever switches 514 and 515 are open, switch 507 is closed, as well as optional switch 517 in one embodiment, and the after the ESS 503 is connected by switches 504 and 505 being closed.

In one embodiment, the ESS 503 cannot, or should not, be used to provide traction inverter power for circumstances such as the ESS is not present, is depleted, or is otherwise disabled. In this embodiment, optional precharge resistor 519, and precharge switch 518 are present. ESS battery 503 remains disconnected by switches 504 and 505 and the precharge switches 509 and 516 are open. The DC link capacitor 502 and node 79 is first precharged to the peak voltage of the mains supply input 511 as previously described herein through the precharge resistor 519 by closing switch 518. Subsequently, switches 514 and 515 are closed, providing power from the input power input 511 to the traction inverter for such purposes as moving the vehicle around a shop or factory, or, if sufficient power can be delivered, a reduced powered electrically tethered virtual towing mode. In one embodiment, a connector in the cable between the power source and the electric vehicle provides a quick disconnect means. In another embodiment, the power source comes from a towing vehicle while "dinghy" or "flat" towing the EV. In a further embodiment, the electric vehicle is charged from the towing vehicle while being towed by using the traction inverter in its boost (or in another embodiment, buck) converter mode.

Figures 1, 5D:
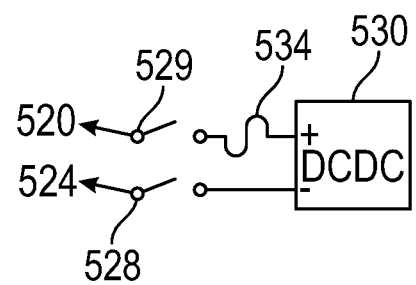
Figures 2, 5D:
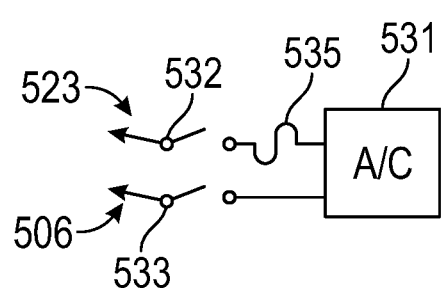
Figures 3, 5D:
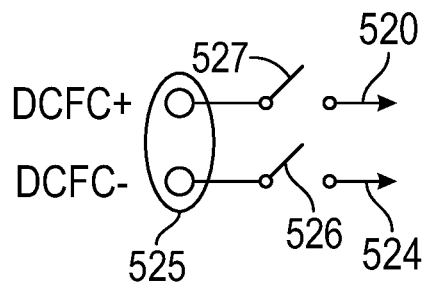

For brevity and simplicity, auxiliary connections to such devices as DC-DC converters and air conditioning compressors, surge protectors, lightning arrestors, and current sensors and fuses, are not shown in FIGS. 5A and 5B, but are readily implemented by those versed in the art. Specific embodiments with connections to DC-DC converter(s) and air conditioning system(s) are depicted in FIG. 5D1-5D3. In various embodiments the same sensors used to control the traction inverter would also be used to control the boost converter.

In one embodiment illustrated in FIG. 5D-3, DC Fast Charging capability is added where a connector 525 is connected to an external fast charging device, depicted with terminals DCFC+ and DCFC−. Signaling pins, controls, fuses, protection and other supporting circuits, are not shown for brevity. When the signaling between progresses to where the fast charger voltage is within a predetermined proximity of that of the ESS, in one embodiment within 20V above the ESS voltage both switches 526, 527 are sequenced to be closed, connecting 526 to 524 and 527 to 520. In one embodiment, the ESS is then to be heated prior to charging, so switches 504 and 505 are closed with the fast charger connected, and the switching devices enter a mode to produce heat, as previously described, while using some or all of the current from the DC Fast Charger. The DC-DC converter is connected in one embodiment, via fuse 534 and by closing switches 528 and 529 as needed. Further switching protocols, sequences and controls are readily devised in further embodiments, in keeping with the teachings herein.

In another embodiment depicted in FIG. 5D-1, a DC-DC converter 530 is used to convert the ESS battery 503 voltage to supply, in one embodiment, a nominal 12 volts to charge a systems 12V battery and the accessories and devices to which it is connected. Again, control circuits are not shown for brevity. The DC-DC converter 530 is connected to node 520 and node 524, or other appropriate nodes for battery charging, in one embodiment via fuse 534 and by closing switch 528 and switch 529 as needed, e.g., under control of MCU 76. Switching devices in the DC-DC converter 530, in one embodiment, enter a commanded mode to produce heat as previously described.

In another embodiment depicted in FIG. 5D-2, an Air Conditioning (A/C) 531 system is used to cool the occupant cabin, the ESS battery 503, or other excessive temperature volumes or masses. In a further embodiment, a heat pump version or component of A/C 531 is used to move heat from warmer to cooler regimes, warming or cooling such devices as the occupant cabin, the ESS battery 503, or other temperature affected volumes. Power for the system, in one embodiment, is from the ESS battery 503. In another embodiment, by connecting to the ESS, energy can be obtained for A/C 531 during charging from the charger energy supply, whether mains power or a DC fast charger, or some other energy source. Connection of A/C 531 to the ESS battery 503 in one embodiment is made through fuse 535 and by connecting switch 532 to node 523 or node 520, and connecting switch 533 to node 524 or node 506, or other switches or nodes in various embodiments.

Figure 13:
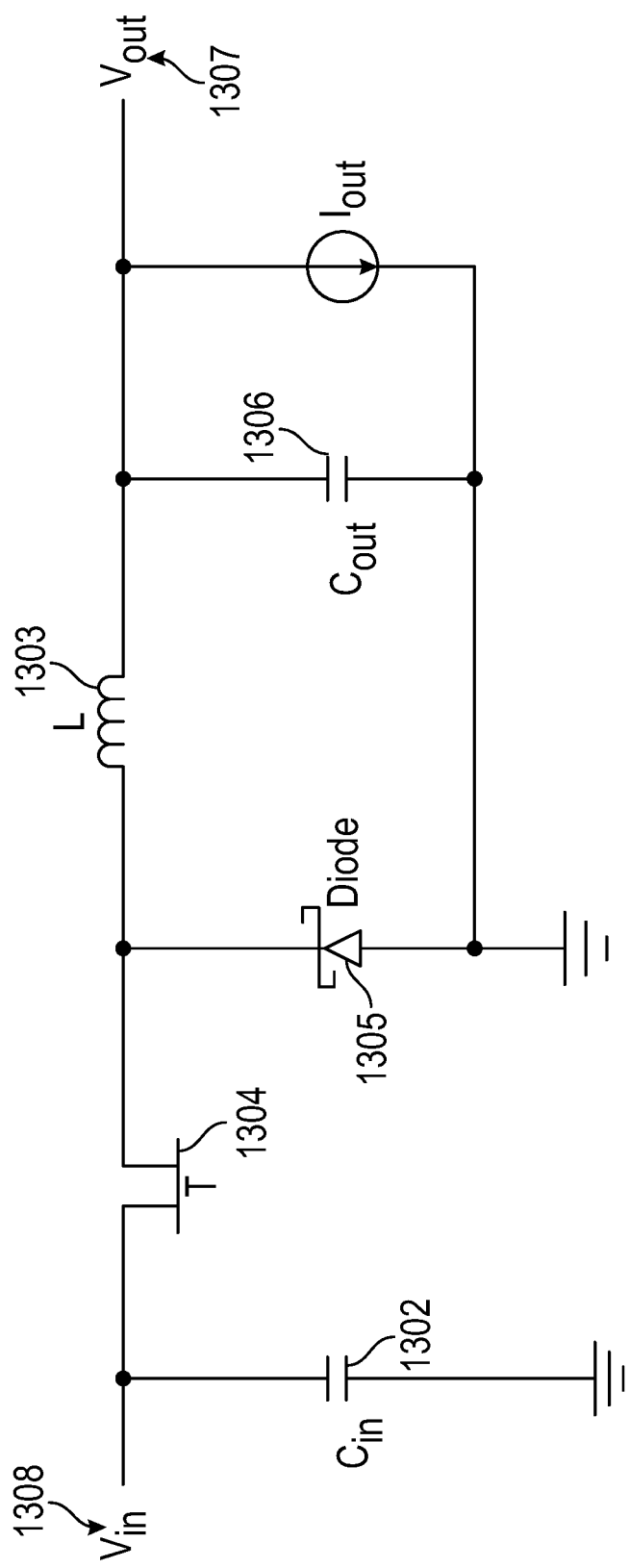
FIG. 13 depicts a buck converter, the functionality of which is achieved in an embodiment of a traction inverter.

FIG. 13 depicts a buck converter, the functionality of which is achieved in an embodiment of a traction inverter, as described below. To understand how the functionality of a buck converter is achieved through implementation in the traction inverter embodiment depicted in FIG. 5B, the functionality of the buck converter is first described. One implementation for charging a battery, generally of lower voltage than an available higher voltage source, is a buck converter. FIG. 13 shows the topology of one embodiment of a buck converter, which may be used when the input voltage 1308 is higher than the desired output voltage 1307. In one embodiment, a low voltage traction motor and its inverter are used for a golf cart that is to be charged from 120 VAC mains. In another embodiment, a boost converter is used to create a more or less sinusoidal load current that is in phase to the mains voltage by piling up energy onto a storage capacitor, which must generally then be bucked down to a suitable voltage for charging the ESS, e.g., a battery. In one embodiment, the EV has multiple traction inverters where one inverter is configured as a boost converter that is not connected to the ESS, and that output voltage is then fed to a second traction inverter configured as a buck converter. The buck converter operates by turning on switch 1304 which connects the input voltage 1308 and input capacitor 1302 to the inductor 1303, causing a current to flow in the inductor 1303. Just as in the boost converter, a magnetic field is established in inductor 1303 which maintains current flow and direction when switching device 1304 is turned off. This continuing current flows in a loop created by the output charge storage device, a capacitor 1306 and/or a battery, and diode 1305. The capacitor takes on charge from the inductor current, increasing its voltage. When the charging current equalizes with the load current, the output voltage stabilizes.

A buck converter can be realized by the novel traction inverter already discussed and where no additional components are needed. Just as with the boost converter, switch 507 is opened and precharge voltages are initialized on capacitors 502a and 502. The buck converter components of FIG. 13 are mapped to FIG. 5B components for an embodiment of a traction inverter with functionality of a buck converter, e.g., in one mode, as follows. Input voltage 1308 will be applied to node 79, input capacitor 1302 will be DC Link capacitor 502, switching device 1304 will be switching devices 58 and 60, inductor 1303 will be the paralleled motor 54 A & B windings in series with motor 54 winding C (or other arrangement of windings to implement the inductor, in various embodiments). The output charge storage device, capacitor 1306 will be the ESS battery 503 in combination with severed (by switch 507) DC link capacitor 502a.

For brevity, precharge of the capacitors is not herein discussed, nor is the sequencing of applying mains power to nodes 79, VDC+ and 506 VDC−, since they can be derived from the teachings herein. An embodiment using switch 517 also is not discussed, since winding isolation would likely require isolating the entire phase leg 71. Description below begins at the point where switches 504, 514, and 515 have been closed and switch 507 is open.

In the first period of buck converter operation, as previously discussed, switching device(s) 1304, 58, and 60 are turned on, connecting the inductor 1303, 55, 56 to the input DC Link supply input voltage 1308, at node 79. Current flows out of the inductor 1303, winding 57 (or other winding in various embodiments and arrangements of windings) into the charge accumulation device 1306, 502a, 503 through forward-biased body diode 508 to produce an output voltage 1307, 520. With switches 58 and 60 on, an opportunity to produce heat in switching devices 59 and 61 is enabled during this first period by partially turning switching devices 59 and 60 on, or partially turning them off in another embodiment.

In the second period of buck converter operation, as previously discussed, switching device 1304, 58, and 60 are turned off, disconnecting inductor 1303 from the input power source 1308, 79. As the established magnetic field in inductor 1303, implemented with arrangement of windings 55, 56, 57 begins to decay, it continues the current flowing in the inductor both in terms of magnitude and direction. This current flows in a loop formed by inductor 1303, implemented with windings 55, 56, 57, forward biased body diode 508, the output charge accumulation devices, capacitor 1306, 502a and ESS battery 503; and the diode 1305, 521, 522. Switching device 63 remains off as it was in the prior period.

Opportunities to intentionally produce heating can be found in the circuit as previously described, through operation of selected MOSFETs, IGBTs or other switching devices in partially on, intermediate state(s) instead of fully off or fully on.

In one embodiment, the switching devices 58 and 60 are partially turned on, in another embodiment they are partially turned off. By throttling current through them, they act as dropping resistors between the input power supply 1308, 79 and the output voltage 1307, 520. This throttling can occur in both periods of switching in the buck converter, or in another embodiment a purely linear drop in voltage is produced to charge the battery 520 and capacitor 502a at a constant current without any switching at all-in order to produce heat. When heat is not to be produced, the switching resumes, transferring current in the buck configuration with high efficiency and little heat loss. As with the boost converter, increasing frequency in one embodiment, or current in another embodiment, in the motor 54 windings 55, 56, 57 will produce a substantial heat source as well through induction heating of the motor magnetic material or through skin effect increases in resistance of the windings.

In some embodiments the wye or star motor connections that result in three motor terminals are not made inside the motor, but are brought out as 3 pairs of terminals, one pair for each coil. It is possible to configure each of these coils as an inductor that is switched by each phase leg respectively, lending itself to other possible converter topologies that exploit the existing circuits in the traction inverter. In these situations, devices that are normally switched off can be operated in the partially on or partially off more, or as dropping resistors, to intentionally produce heat. In another embodiment, an inductor, or a plurality thereof, is used to augment or replace the motor winding inductances set forth herein by switching them into the circuit by opening a contactor across them for a buck or boost converter mode, and by shorting the contactor across the inductor(s) in traction inverter mode when the inductor is in series with the motor winding; this reuses the switching devices and their supporting circuits, including the ability to have the switching device(s) operate in a third intermediate state for producing heat.

In one embodiment the traction inverter is reduced in complexity by eliminating one of the phase legs 70, devices as MOSFETs 58, 59, and drivers 64 and 65, and of course the three-phase motor 54, which results in formation of an "H-bridge" circuit that uses the remaining drivers 66, 67, 68, 69 and respective MOSFETs 60, 61, 62, 63. H-bridges have utility for controlling current through Pulse Width Modulation (PWM) and for being able to apply reverse polarity to Direct Current (DC) devices, such as the series wound brushed electric motor 1412 of FIG. 14A as typically found in golf carts and other small electric vehicles. In another embodiment a parallel wound motor can be connected to the H-bridge according to a means familiar to those versed in the art.

Figures 1, 14A:
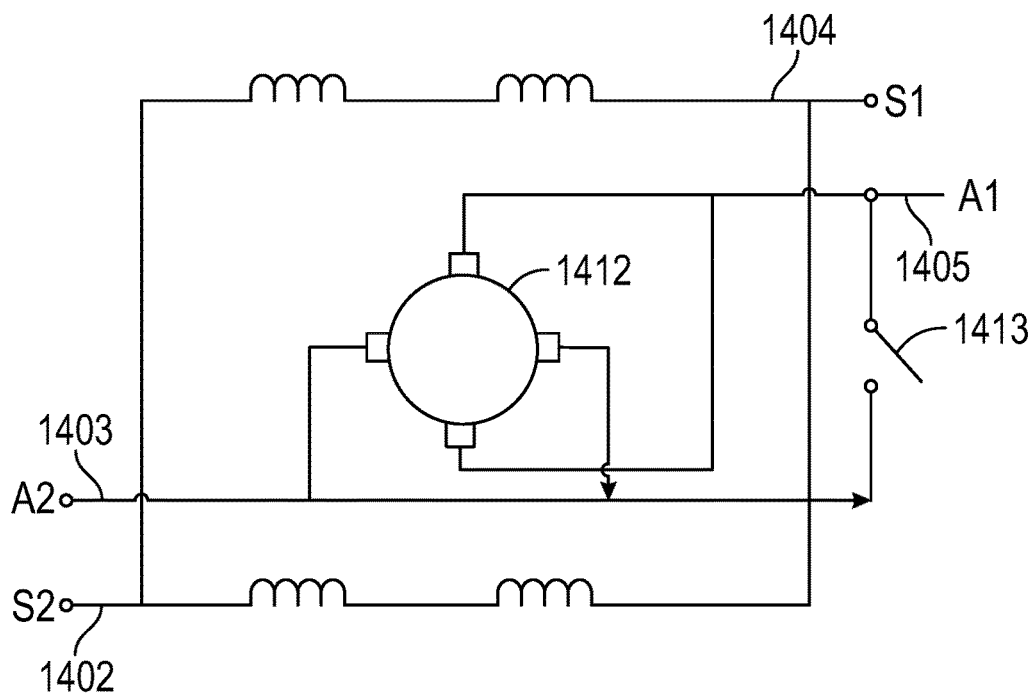
Figures 2, 14A:
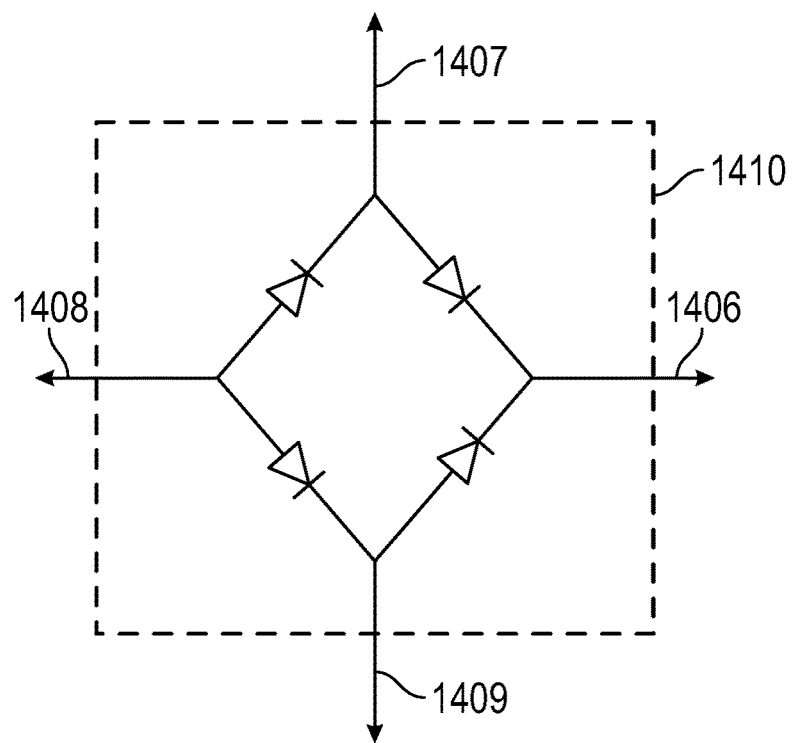

A brushed DC motor 1412 is schematically shown in FIG. 14A-1. In one embodiment where the motor 1412 of FIG. 14A-1 is operating in its series-wound mode, motor terminals S2 1402 is connected to 1405 of a bridge rectifier 1410 of FIG. 14A-2, A1 1405 of FIG. 14A-1 is connected to 1409 of a bridge rectifier 1410, motor terminal S1 1404 is connected to 1408 of the bridge rectifier 1410, and 1407 of the bridge rectifier 1410 is connected to 55 of phase leg 71, and motor terminal A2 1403 is connected to winding 57 of phase leg 72.

In one embodiment, the motor 1412 turns clockwise by turning on switching devices 60 and 63 of the H-bridge while switching devices 62 and 61 of the H-bridge are off. The series wound motor 1412 is reversed in the preferred embodiment by changing the direction of current through it and the bridge rectifier, or in some complex embodiments by using the connectivity chart 1411 shown in FIG. 14B, so reversal would occur with turning on switching devices 62 and 61 of the H-bridge while switching devices 60 and 63 of the H-bridge are off.

In alternate embodiments; PWM is used in the "on" devices of the H-bridge to control the speed or torque of the motor. In one embodiment, a switch device that is designated as "off" in the H-bridge is turned partially on by a circuit as described elsewhere herein, to produce heat. This could be implemented, e.g., in MCU 76 operating the H-bridge according to the connection chart 1411 depicted in FIGS. 14A-1 and 14A-2, or variation thereof. In one embodiment, that heat is used to heat the ESS to improve its energy delivery capability to a motor, e.g., in cold weather.

In one embodiment, the H-bridge can also be used as a buck converter ESS charger in the buck configuration previously described for the three phase traction inverter but with phase leg 70 and its supporting circuits omitted; and with a switch 1413, present only when use of the H-bridge as a boost or buck converter mode is needed is needed and when closed it prevents the motor rotor from turning by shorting out the armature via its terminals A1 1405 and A2 1403.

In another embodiment the H-bridge can also be used as a boost converter ESS charger in the configuration previously described but with phase leg 70 and its supporting circuits omitted and with a switch 1413, present only when use of the H-bridge as a boost or buck converter is needed in order to keep the motor rotor from turning by shorting out A1 1405 and A2 1403 when that switch is closed.

In other embodiments, heat, such as for the heating the ESS or vehicle cabin, may be generated as previously described under the respective buck and boost converter discussions, herein, but with phase Leg 70 and its supporting circuits eliminated.

In some embodiments using a parallel motor windings scheme, the bridge rectifier 1410 is not used and those versed in the art connect the parallel winding brushed DC motor appropriately. In one embodiment of a parallel winding motor controller, stator terminals S2 1402 and S1 1404 are each connected to one of the LESS terminals to produce a direct current and steady magnetic field with A1 1405 is connected to one phase leg 71 at winding 56 and A2 1403 connected to phase leg 72 at winding 57. Operation of the H-bridge for forward, reverse, PWM control, buck conversion, boost conversion, and heating is as described for the H-bridge. Note that the motor inductance is reduced since only its armature coils are used.

In boost or buck converter mode when a parallel wound motor is used, one or both of S1 1404 or S2 1402 are disconnected to keep the motor from turning. In another embodiment, the motor is a permanent magnet brushed DC motor 1412 where the stator coil that was connected internally to S1 1404 and S2 1402 is replaced by magnets and terminals S1 and S2 are not present.

In another embodiment, a DC device, such as a brushed DC electric motor 1412, is simply turned on and off or speed or torque controlled with PWM, without need for the reversing capability of the H-bridge. In one embodiment, phase legs 70 and 71 of FIG. 5A or 5B or variation thereof along with their support circuits sensors and drivers are deleted, leaving only one phase leg 72 and its driver circuits. Heat may be generated by the device that is designated normally as off in the switching cycle by partially turning it off in one embodiment, or partially turning it on in a second embodiment, using methods previously described herein. Arguably only one switching device is needed of the two in the singular phase leg with the other permanently off or even deleted, but heating modes are better implemented with both devices in the phase leg, as is the ability to revert to a buck conversion mode in one embodiment, or a boost conversion mode in another embodiment, for ESS thermal conditioning and charging.

The use of full wave rectifiers in the embodiments described herein is not prescriptive, and other methods such as synchronous switching devices with lower losses or higher current carrying ability could be used. Likewise, switching devices' body diodes cannot carry as much current when forward biased as the switched on switching device, or a body diode may not exist in some switching devices such as GaN HEMTs (Gallium Nitride High Electron Mobility Transistor), so some embodiments will use an external diode connected to the terminals as shown herein to achieve the same functionality with higher current carrying possible.

Some embodiments use a plurality of phases in a traction inverter and other possible combinations of switches and motor winding inductors may be used to produce other classical switching power converter topologies. In any of these embodiments, productive heat may be generated by those devices that would normally be designated as off by partially turning them on in one embodiment and partially turning them off in another embodiment.

FIG. 13 shows the topology of a buck converter, which is used when the input voltage 1308 is higher than the desired output voltage 1307. FIGS. 15A and 15B show the same buck converter (FIG. 15A) and buck boost converter (FIG. 15B) topology, and is identical to FIG. 13 if the body diode 1505 (FIG. 15A)/15105 (FIG. 15B) is considered and the switching device 1509 (FIG. 15A)/15109 (FIG. 15B) is ignored by never switching it on. In practice, switching device 1509/15109 is turned on during the buck/boost conversion cycle when diode 1505/15105 is forward biased, reducing the losses in the circuit due to the forward voltage drop across the diode. For the sake of brevity each of the components 1502, 1503, 1504, 1506, 1507, and 1508 of FIG. 15A and corresponding components 15102, 15103, 15104, 15106, 15107, and 15108 of FIG. 15B are not described in detail but function as described with respect above, e.g., as described for corresponding components of FIG. 13. Configuration of the traction inverter of FIG. 5 as a buck converter now, with the device of FIG. 13 mapping to the devices of FIGS. 15A-15B, is as previously described herein in one embodiment. For ease of description, the simplified figures, rather than FIG. 5's components are discussed, with mappings to FIG. 5 as a buck converter as previously described.

In one embodiment, production of a |sin| wave voltage output is desired, to power 120 VAC devices, as found at the output of a full bridge rectifier or a simple half wave rectifier in another embodiment. Such a waveform can easily be produced at 1507, 1307 with a traction inverter configured as a buck converter in one embodiment, where the ESS voltage 520 is greater than the peak voltage of the sinewave voltage, by varying the duty cycle of switching device 1504,

1304, which results in a positive going 120 Hz sine wave voltage output 1507, 1307 with respect to ground in one embodiment. In a further embodiment, devices that are off in the switching cycle are partially turned on or are partially turned off in order to purposefully generate heat for such applications as ESS battery 503 or passenger cabin (pre) heating.

In another embodiment the output 1507, 1307 of the buck converter configured traction inverter is comprised of a positive-going sinusoidal voltage waveform is fed into an H-bridge circuit, which switches the 120 Hz half sine wave voltage input to alternate polarity on each 120 Hz cycle, producing a true 120 VAC 60 Hz AC sine wave output in the H-bridge circuit. In one embodiment, the switching devices to form an H-bridge are repurposed from the unused devices of a multiphase traction inverter. In another embodiment, they are additional devices. In a further embodiment, devices that are off in the switching cycle are partially turned on or are partially turned off in order to purposefully generate heat for such applications as ESS battery 503 or passenger cabin (pre)heating.

In present practice, the body diodes in the switching devices, or separate lower-loss Schottky diodes, are used as 3-phase rectifiers during regenerative braking, which is when the traction motor acts as a generator. The kinetic energy of the vehicle is typically used to charge the HV battery during regenerative braking in an EV with the motor acting as an electric generator (technically a multi-phase alternator), but cannot be facilitated when the battery is at or near a full state of charge. The diodes themselves will generate heat during braking—this heat is inherently captured by the traction inverter's coolant.

In one embodiment, the switching device does not have a body diode, such as is the case for a Gallium Nitride (GaN) High Electron Mobility Transistor (HEMT). By partially turning on, or partially turning off, the switching device the current is throttled in the partially conductive switching device, dissipating that energy as significant heat. The switching on of the devices can be sequenced to emulate 3-phase rectification; this would normally be desirable for low loss battery charging from the motor as a generator, but here the switching device is partially turned off, or partially turned on, to produce heat, resulting in little, or a controlled amount, of the generator's energy being used to charge the HV battery. This heating, from absorbing the vehicle's kinetic energy in the switching device(s) as heat, and slowing it down, in one embodiment, may be used for such purposes as battery or cabin warming.

In another embodiment, sufficient cooling means is provided to the switching devices to enable substantial heat energy production in the switching devices through traction motor braking by those switching devices in their third state, with the resulting heat in the coolant being either exploited to warm the cabin or battery, or being dumped overboard into the vehicle's heat-sinkable environment; in one embodiment by means of a liquid to air heat exchanger.

In further embodiments, the current in the switching device(s) is regulated to ensure that no net current is presented to a fully-, or almost fully-, charged battery. Motor braking is typically performed by high power resistors (typically in public transit EVs or industrial drives) or friction brakes are relied upon because substantial charging of the battery is not possible when it nears a fully charged state.

The switching of states from fully on to fully off is well known to practitioners of the art; in summary, a pair of isolated power supplies are created for the high side switching device (the low side switching operates in the same manner, so the high side will be discussed for brevity), with another pair of supplies, optionally isolated, for the low side switching device. In one embodiment +15V is applied to its gate to fully turn on a SiC MOSFET and −4V is applied to the gate to fully turn off the device, with both supplies referencing their voltages the Source of the MOSFET.

These power supplies have relatively large capacitors to stabilize their outputs, which makes them very slow in relation to the frequency at which the switches operate in systems such as traction inverters and EV chargers, as well as having unidirectional power supply switching devices in most embodiments. The positive power supply sources electric charge and, conversely the negative power supply sinks electric charge. A higher external voltage on the positive supply, or a lower external voltage on the negative supply, can kill that power supply by "backdriving" it if a protection circuit is not incorporated. These power supply pairs are switched to the MOSFET gate to turn it fully on or off in one embodiment by a gate driver circuit.

In some embodiments, a third switching device state is introduced as a partially on or a partially off state. In one embodiment, the power supply, is set by a feedback circuit to produce a current in the device of 3 amps, which will result in a production of approximately 1200 watts of heat, assuming a 400V HV battery voltage. In one embodiment, this feedback circuit derives its error voltage by sampling Ids (drain to source current) of the MOSFET during the time that the switching device is in its third state. For one embodiment, assume this third power supply is operating to produce +3V at its output, which is then switched by the gate driver circuit onto the gate of its respective MOSFET.

Recall that in one embodiment, switching devices that are normally in an off state are placed in the third state when heating is desired. The inverter or DC charger then switches between a fully on state, and the partially on third state. This superficially seems simple enough, except that the gate of a MOSFET has a very large electrical charge developed on it from being fully turned on. Switching the MOSFET gate from, in one embodiment, +15V as fully on, to the partially on state of +3V means that the +3V power supply is backdriven by the instantaneous +15V being applied to the gate's capacitance at the instant the gate driver connects the +3V supply, killing the +3V supply in one embodiment due to backdriving it with a significant amount of current.

In one embodiment, a gate driver circuit switches from +15V to the −4V supply briefly, and after the MOSFET gate voltage has very quickly discharged to, or is just below, the voltage of the third supply (+3V as a snapshot in one embodiment), due to the gate charge being very quickly sunk by the negative supply, the gate driver then switches from the off state negative gate voltage (−4V) to the third positive supply (nominally +3V) which then can very quickly source the charge needed to hold the gate voltage to that needed to maintain a setpoint current of 3 amps. The gate driver circuit then switches the MOSFET gate back to +15 v at the next switching state that the switching device is designated on, very quickly charging its gate to +15V and switching it fully on for the next state in a traction inverter or EV charger. Each power supply in one embodiment is capable of sinking or sourcing several amps so as to very quickly switch the MOSFET's gate voltage.

In one embodiment, the gate driver operates as an amplifier, creating heating in the MOSFET driver. In another embodiment, rise and fall times in the gate driver circuit are modulated to produce controllable MOSFET heating.

What is claimed is:

1. A multi-phase traction inverter, comprising:
a plurality of phases to connect to and operate a plurality of windings of an electric motor, each of the plurality of phases having at least one semiconductor switching device, the at least one semiconductor switching device configured to switch between at least three differing states, the at least three differing states comprising a fully on state, a fully off state and an intermediate state, the intermediate state between the fully on state and the fully off state;
a controller coupled to the plurality of phases, to operate the plurality of phases in a first mode of the traction inverter to drive the electric motor as a traction motor; and
the controller to operate the plurality of phases in a second mode of the traction inverter as a boost converter, the second mode including:
the controller to operate the plurality of phases to arrange the plurality of windings of the electric motor as an inductor of the boost converter; and
the controller to operate at least one of the plurality of phases as a switching device of the boost converter, to alternate connection of the inductor and boost an output voltage above an input voltage.

2. The multi-phase traction inverter of claim 1, further comprising:
a plurality of switches; and
the controller to operate the plurality of switches to connect an energy storage system as an input device of the traction inverter in the first mode and connect the energy storage system as an output device of the boost converter implemented by the traction inverter in the second mode.

3. The multi-phase traction inverter of claim 1, further comprising:
the controller to operate a plurality of phase legs.

4. The multi-phase traction inverter of claim 1, further comprising:
the controller to operate the plurality of phases to throttle current through at least one switching device of the plurality of phases to produce heat.

5. The multi-phase traction inverter of claim 1, further comprising:
a positive voltage terminal, a negative voltage terminal, a DC (direct current) capacitor, and a plurality of switches; and
the controller to operate the plurality of switches to arrange and rearrange connections among an energy storage system, the positive voltage terminal, the negative voltage terminal, and the DC capacitor.

6. The multi-phase traction inverter of claim 1, wherein:
to arrange the plurality of windings of the electric motor as an inductor comprises a winding in series with two parallel-connected windings, including connections through operation of the plurality of phases.

7. The multi-phase traction inverter of claim 1, wherein:
to arrange the plurality of windings of the electric motor as an inductor comprises a first winding in series with a second winding, and a third winding disconnected from the plurality of phases, through operation of the plurality of phases.

8. A multi-phase traction inverter, comprising:
a plurality of phases to connect to and operate a plurality of windings of an electric motor, each of the plurality of phases having at least one semiconductor switching device, the at least one semiconductor switching device configured to switch between at least three differing states, the at least three differing states comprising a fully on state, a fully off state and an intermediate state, the intermediate state between the fully on state and the fully off state;
a controller coupled to the plurality of phases, to operate the plurality of phases in a first mode of the traction inverter to drive the electric motor as a traction motor; and
the controller to operate the plurality of phases in a second mode of the traction inverter as a buck converter, the second mode including:
the controller to operate the plurality of phases to arrange the plurality of windings of the electric motor as an inductor of the buck converter; and
the controller to operate at least one of the plurality of phases as a switching device of the buck converter, to alternate connection of the inductor and produce an output voltage that is lower than an input voltage.

9. The multi-phase traction inverter of claim 8, further comprising:
the controller to operate a plurality of phase legs.

10. The multi-phase traction inverter of claim 8, further comprising:
the controller to operate the plurality of phases to throttle current through at least one switching device of the plurality of phases to produce heat.

11. The multi-phase traction inverter of claim 8, further comprising:
a positive voltage terminal, a negative voltage terminal, a DC (direct current) capacitor, and a plurality of switches; and
the controller to operate the plurality of switches to arrange and rearrange connections among an energy storage system, the positive voltage terminal, the negative voltage terminal, and the DC capacitor.

12. The multi-phase traction inverter of claim 8, wherein:
to arrange the plurality of windings of the electric motor as an inductor comprises a winding in series with two parallel-connected windings, including connections through operation of the plurality of phases.

13. The multi-phase traction inverter of claim 8, wherein:
to arrange the plurality of windings of the electric motor as an inductor comprises a first winding in series with a second winding, and a third winding disconnected from the plurality of phases, through operation of the plurality of phases.

14. A multi-phase traction inverter, comprising:
a plurality of phases to connect to and operate a plurality of windings of an electric motor, each of the plurality of phases having at least one semiconductor switching device, the at least one semiconductor switching device configured to switch between at least three differing states, the at least three differing states comprising a fully on state, a fully off state and an intermediate state, the intermediate state between the fully on state and the fully off state; and
a controller coupled to the plurality of phases, to operate the plurality of phases in a first mode of the traction inverter to drive the electric motor as a traction motor;
the controller to operate the plurality of phases in a second mode of the traction inverter as a boost converter, the second mode including:
the controller to operate the plurality of phases to arrange the plurality of windings of the electric motor as an inductor of the boost converter; and the controller to operate at least one of the plurality of phases as a switching device of the boost converter, to alternate connection of the inductor and boost an output voltage above an input voltage; and the controller to operate the plurality of phases in a third mode of the traction inverter as a buck converter, the third mode including:

the controller to operate the plurality of phases to arrange the plurality of windings of the electric motor as an inductor of the buck converter; and the controller to operate at least one of the plurality of phases as a switching device of the buck converter, to alternate connection of the inductor and produce an output voltage that is lower than an input voltage.

15. The multi-phase traction inverter of claim 14, further comprising:

a plurality of switches; and the controller to operate the plurality of switches to connect an energy storage system battery as an input device of the traction inverter in the first mode, connect the energy storage system battery as an output device of the boost converter implemented by the traction inverter in the second mode, and connect a further battery as an output device of the buck converter implemented by the traction inverter in the third mode.

16. The multi-phase traction inverter of claim 14, further comprising:

the controller to operate a plurality of phase legs.

17. The multi-phase traction inverter of claim 14, further comprising:

the controller to operate the plurality of phases to throttle current through at least one switching device of the plurality of phases to produce heat.

18. The multi-phase traction inverter of claim 14, further comprising:

a positive voltage terminal, a negative voltage terminal, a DC (direct current) capacitor, and a plurality of switches; and the controller to operate the plurality of switches to arrange and rearrange connections among an energy storage system, the positive voltage terminal, the negative voltage terminal, and the DC capacitor.

19. The multi-phase traction inverter of claim 14, wherein:

to arrange the plurality of windings of the electric motor as an inductor for the second mode or the third mode comprises a winding in series with two parallel-connected windings, including connections through operation of the plurality of phases.

20. The multi-phase traction inverter of claim 14, wherein:

to arrange the plurality of windings of the electric motor as an inductor for the second mode or the third mode comprises a first winding in series with a second winding, and a third winding disconnected from the plurality of phases, through operation of the plurality of phases.

* * * * *